(12) United States Patent
Ando et al.

(10) Patent No.: US 12,146,064 B2
(45) Date of Patent: Nov. 19, 2024

(54) RECORDING METHOD

(71) Applicant: SEIKO EPSON CORPORATION, Tokyo (JP)

(72) Inventors: Keigo Ando, Matsumoto (JP); Mitsuaki Kosaka, Minowa (JP)

(73) Assignee: SEIKO EPSON CORPORATION (JP)

( * ) Notice: Subject to any disclaimer, the term of this patent is extended or adjusted under 35 U.S.C. 154(b) by 170 days.

(21) Appl. No.: 18/070,873

(22) Filed: Nov. 29, 2022

(65) Prior Publication Data

US 2023/0167313 A1 Jun. 1, 2023

(30) Foreign Application Priority Data

Nov. 30, 2021 (JP) ................. 2021-194029

(51) Int. Cl.
*B41J 11/00* (2006.01)
*C09D 11/102* (2014.01)
*C09D 11/322* (2014.01)

(52) U.S. Cl.
CPC ......... *C09D 11/102* (2013.01); *B41J 11/0022* (2021.01); *C09D 11/322* (2013.01)

(58) Field of Classification Search
CPC ......... B41J 11/0022; B41J 11/00; B41J 2/211; B41J 2/2114; B41J 2/2117; B41J 11/0015; B41J 11/002; B41J 11/0021; B41J 11/00214; B41J 11/00244; C09D 11/102; C09D 11/322; C09D 11/106; C09D 11/40; C09D 11/54; C09D 11/38; C09D 11/36; B41M 5/0011
See application file for complete search history.

(56) References Cited

U.S. PATENT DOCUMENTS

2019/0284426 A1 9/2019 Matsuzaki et al.

FOREIGN PATENT DOCUMENTS

| EP | 3366486 A1 | * | 8/2018 | .......... B41J 11/0015 |
| JP | 2019-162840 A | | 9/2019 | |
| JP | 2022101991 | * | 7/2022 | ............ B41J 2/2117 |
| KR | 20140145093 | * | 12/2014 | .......... B41J 11/0022 |

* cited by examiner

*Primary Examiner* — Kristal Feggins
(74) *Attorney, Agent, or Firm* — Harness, Dickey & Pierce, P.L.C.

(57) ABSTRACT

A recording method is a method including an adhesion step of adhering an ink composition to a recording medium, in which the recording medium is a low-absorbing recording medium or a non-absorbing recording medium, the adhesion step is performed by scanning that is carried out by jetting the ink composition from an ink jet head to make the ink composition adhere to the recording medium while moving relative positions of the ink jet head and the recording medium, the scanning is performed seven times or less on an identical region of the recording medium, the ink composition is an aqueous ink containing a coloring material and a silicone-based surfactant A, and a maximum peak of the silicone-based surfactant A in a molecular weight range of 300 or greater is present in a range of 3000 to 20000 in a molecular weight distribution obtained by gel permeation chromatography.

13 Claims, 1 Drawing Sheet

RECORDING METHOD

The present application is based on, and claims priority from JP Application Serial Number 2021-194029, filed Nov. 30, 2021, the disclosure of which is hereby incorporated by reference herein in its entirety.

BACKGROUND

1. Technical Field

The present disclosure relates to a recording method.

2. Related Art

An ink jet method enables formation of a high-quality image on a recording medium, and thus various techniques of the related art have been developed. For example, not only a recording device using an ink jet method but also a composition used for the device have been actively developed. Further, a combination of a recording device, an ink composition, a treatment liquid, a recording medium, and the like or a recording method using the combination has been widely examined.

When an image is recorded on a low-absorbing or non-absorbing recording medium by an ink jet method, dots of an ink adhered to the recording medium may remain on the recording medium for a period of time without being absorbed. In such a case, dots of the ink are aggregated and aggregation unevenness (bleeding unevenness) is likely to occur. Therefore, for example, JP-A-2019-162840 discloses a recording method that enables a decrease in aggregation of dots by increasing the number of passes in ink jet recording, distributing dots of an ink in a plurality of passes to make the ink adhere to a recording medium, and drying the ink during the adhesion.

However, when the number of passes is increased, the image quality is likely to be improved, but the speed of recording an image is decreased, and as a result, the productivity of a recorded material is insufficient. For this reason, there is a demand for a recording method of enhancing the productivity of a recorded material and enhancing the image quality of an image of a recorded material to be obtained.

SUMMARY

According to an aspect of the present disclosure, there is provided a recording method including: an adhesion step of adhering an ink composition to a recording medium, in which the recording medium is a low-absorbing recording medium or a non-absorbing recording medium, the adhesion step is performed by scanning that is carried out by jetting the ink composition from an ink jet head to make the ink composition adhere to the recording medium while moving relative positions of the ink jet head and the recording medium, the scanning is performed seven times or less on an identical region of the recording medium, the ink composition is an aqueous ink containing a coloring material and a silicone-based surfactant A, and a maximum peak of the silicone-based surfactant A in a molecular weight range of 300 or greater is present in a range of 3000 to 20000 in a molecular weight distribution obtained by gel permeation chromatography.

DESCRIPTION OF EXEMPLARY EMBODIMENTS

Figure 1:
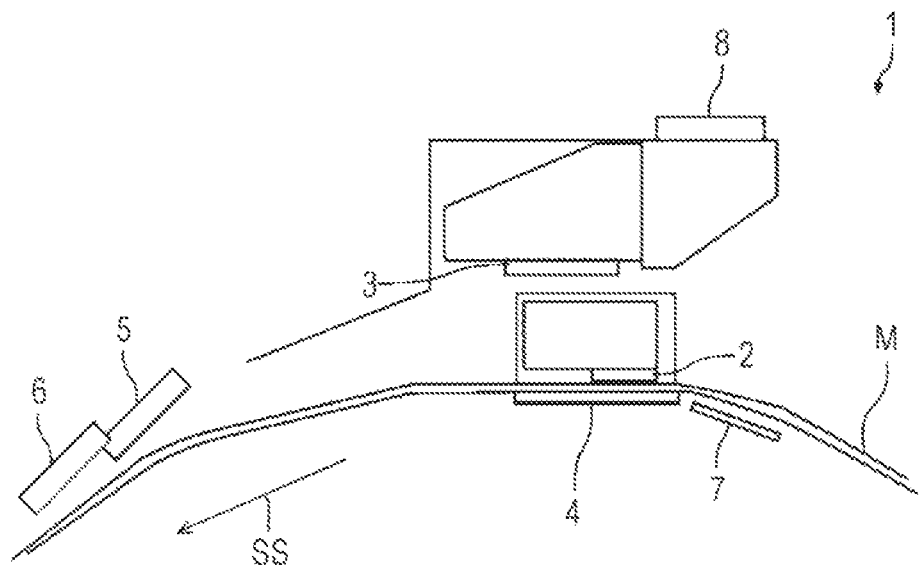
FIG. 1 is a schematic view showing an example of an ink jet recording device.

Hereinafter, embodiments of the present disclosure will be described. The embodiments described below are used to describe examples of the present disclosure. The present disclosure is not limited to the following embodiments and include various modifications made within a range not departing from the gist of the present disclosure. Further, not all the configurations described below are essential configurations of the present disclosure.

In the present specification, "(meth)acryl" denotes acryl or methacryl, and "(meth)acrylate" denotes acrylate or methacrylate.

1. Recording Method

A recording method of the present embodiment includes an adhesion step of adhering an ink composition to a recording medium.

1.1. Adhesion Step

The adhesion step is performed by scanning that is carried out by jetting the ink composition from an ink jet head to make the ink composition adhere to the recording medium while moving relative positions of the ink jet head and the recording medium, and the scanning is performed seven times or less on an identical region of the recording medium. Hereinafter, the recording medium, the ink composition, and an ink jet recording device (ink jet head) will be described, and thereafter, the scanning will be described.

1.1.1. Recording Medium

The recording medium on which an image is formed by the recording method according to the present embodiment is a liquid low-absorbing recording medium such as actual printing paper or a liquid non-absorbing recording medium such as a metal, a glass, a film, or a polymer.

The excellent effects of the recording method according to the present embodiment are particularly significant when an image is recorded on a liquid low-absorbing or liquid non-absorbing recording medium. That is, according to the recording method of the present embodiment, a high-quality image can be formed even when a low-absorbing recording medium or a non-absorbing recording medium in which aggregation unevenness is relatively likely to occur.

The liquid low-absorbing or liquid non-absorbing recording medium denotes a recording medium having a property of not absorbing a liquid or hardly absorbing a liquid. Quantitatively, the liquid non-absorbing or liquid low-absorbing recording medium denotes "recording medium in which the water absorption amount from the start of contact to 30 $msec^{1/2}$ in the Bristow method is 10 $mL/m^2$ or less". The Bristow method is a method that has been widely used as a method of measuring the liquid absorption amount in a short time and that is also adopted by Japan Technical Association of The Pulp And Paper Industry (JAPAN TAPPI). The details of the test method are described in Standard No. 51 "Paper and Paperboard, Liquid Absorbency Test Method, Bristow Method" of "Paper and Pulp Test Method (2000) by JAPAN TAPPI". Meanwhile, a liquid absorbing recording medium denotes a recording medium that does not correspond to the liquid non-absorbing or liquid low-absorbing recording medium. In the present specification, the term "liquid low-absorbing" or "liquid non-absorbing" will also be simply referred to as low-absorbing or non-absorbing.

Examples of the liquid non-absorbing recording medium include films or plates made of plastics such as polyvinyl chloride, polyethylene, polypropylene, and polyethylene terephthalate (PET), plates made of metals such as iron, silver, copper, and aluminum, metal plates in which such various metals are produced by vapor deposition, plastic films, and plates of alloys such as stainless steel or brass. Further, other examples thereof include a medium obtained by coating a base material such as paper with plastic, a medium obtained by bonding a plastic film onto a base material such as paper, and a plastic film that does not have an absorbing layer (receiving layer). Examples of the plastic here include polyvinyl chloride, polyethylene terephthalate, polycarbonate, polystyrene, polyurethane, polyethylene, and polypropylene.

Further, examples of the liquid low-absorbing recording medium include a recording medium provided with a coating layer (receiving layer) having a surface that receives a liquid. Specifically, examples of a recording medium whose base material is paper include actual printing paper, and examples of a recording medium whose base material is a plastic film include a recording medium obtained by coating surfaces of polyvinyl chloride, polyethylene terephthalate, polycarbonate, polystyrene, polyurethane, polyethylene, polypropylene, or the like with a hydrophilic polymer and the like, and a recording medium obtained by coating the surface thereof with particles of silica, titanium, or the like using a binder.

Further, the recording medium may be transparent colorless, translucent, transparent colored, chromatic color opaque, achromatic color opaque, or the like. Further, the recording medium itself may be colored, translucent, or transparent.

1.2.2. Ink Composition

An ink composition is an aqueous ink composition, contains a coloring material, a predetermined silicone-based surfactant A, and water, and may contain an organic solvent, resin particles, wax, other surfactants, and the like as necessary. In the present specification, "ink composition" will also be simply referred to as "ink" or the like. Further, in the present specification, "aqueous ink" denotes an ink containing water as a main solvent component, and "ink jet ink" denotes an ink that can be used for recording an image by being jetted from an ink jet head using an ink jet method.

(1) Coloring Material

The ink jet ink composition used for the recording method according to the present embodiment contains a coloring material.

Any of a pigment or a dye can be used as the coloring material, and examples thereof include an inorganic pigment such as carbon black or titanium white, an organic pigment, an oil-soluble dye, an acidic dye, a direct dye, a reactive dye, a basic dye, a dispersed dye, and a sublimation dye. It is preferable that the ink composition contain a pigment, and the pigment may be dispersed by a dispersed resin.

Pigment

Examples of the inorganic pigment include carbon blacks (C.I. Pigment Black 7) such as furnace black, lamp black, acetylene black, and channel black, iron oxide, titanium oxide, zinc oxide, and silica.

Examples of the organic pigment include a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolo-pyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, and an azo-based pigment.

Specific examples of the organic pigment used in the ink composition include the followings.

Examples of a cyan pigment include C.I. Pigment Blue 1, 2, 3, 15:3, 15:4, 15:34, 16, 22, and 60, and C.I. Vat Blue 4 and 60, and preferred examples thereof include a mixture of one or two or more kinds of pigments selected from the group consisting of C.I. Pigment Blue 15:3, 15:4, and 60.

Examples of a magenta pigment include C.I. Pigment Red 5, 7, 12, 48 (Ca), 48 (Mn), 57 (Ca), 57:1, 112, 122, 123, 168, 184, and 202, and C.I. Pigment Violet 19, and preferred examples thereof include a mixture of one or two or more kinds of pigments selected from the group consisting of C.I. Pigment Red 122, 202, and 209, and C.I. Pigment Violet 19.

Examples of a yellow pigment include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185, and preferred examples thereof include a mixture of one or two or more kinds of pigments selected from the group consisting of C.I. Pigment Yellow 74, 109, 110, 128, 138, 150, and 180.

Further, a pigment of a color other than the above-described colors can be used. Examples thereof include an orange pigment and a green pigment.

The pigments described above are examples of suitable pigments, and the pigments are not limited thereto. These pigments may be used alone or in the form of a mixture of two or more kinds of pigments or may be used in combination with dyes.

Further, the pigment may be used by being dispersed with a dispersant selected from a water-soluble resin, a surfactant, or the like or may be used by oxidizing or sulfonating the surface of the pigment with ozone, hypochlorous acid, fuming sulfuric acid, or the like so that the pigment is dispersed as a self-dispersing pigment. Further, the surfactant that can be used as a dispersant may be any of other surfactants that may be contained in the ink composition described below.

The dye is not particularly limited, and examples thereof include an acidic dye, a basic dye, a direct dye, a reactive dye, and a dispersed dye. Specific examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 132, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, 141, and 249, and C.I. Reactive Black 3, 4, and 35. The dye may be used alone or in combination of two or more kinds thereof.

The content of the coloring material is preferably 0.5% by mass or greater 10% by mass or less, more preferably 1.0% by mass or greater and 8.0% by mass or less, still more preferably 2.0% by mass or greater and 6.0% by mass or less, and even still more preferably 2.5% by mass or greater and 5.0% by mass or less with respect to the total amount of the ink composition. When the content of the coloring material is in the above-described ranges, the jetting stability in the ink jet method is likely to be further improved.

(2) Surfactant

The ink composition contains a predetermined silicone-based surfactant A and may contain a silicone-based surfactant B and other surfactants as necessary.

(2-1) Silicone-Based Surfactant A

The silicone-based surfactant A is a surfactant in which the maximum peak in a molecular weight range of 300 or greater is present in a molecular weight range of 3000 to 20000 in the molecular weight distribution obtained by gel permeation chromatography (GPC). Since the ink composition contains such a silicone-based surfactant A, the viscosity of the ink composition is likely to increase in the process of drying a solvent on the recording medium, and thus it is possible to suppress a plurality of dots from being coalesced or mixed, suppress the occurrence of image unevenness (image quality unevenness), and improve the visibility and the optical density of an image.

The maximum peak of the silicone-based surfactant A in a molecular weight range of 300 or greater is present in a molecular weight range of 3000 to 20000, preferably in a molecular weight range of 4000 to 15000, and more preferably in a molecular weight range of 5000 to 10000. When the maximum peak thereof in a molecular weight range of 300 or greater is present in a molecular weight range of 3000 or greater, coalescence or mixing of dots of the ink composition are likely to be suppressed, and the visibility and the optical density of an image are likely to be further improved. Further, when the maximum peak in a molecular weight range of 300 or greater is present in a molecular weight range of 20000 or less, the jetting stability is likely to be further improved.

The maximum peak of the silicone-based surfactant A in a molecular weight of 300 or greater can be specified from a chart of the molecular weight distribution in GPC obtained with a lateral axis as "logarithmic value of a molecular weight M (Log M)" and with a longitudinal axis as "differential value of a density fraction (dw/d(Log M))". Further, "maximum peak" denotes the maximum peak among peaks (mountain) in a molecular weight range of 300 or greater. Further, "maximum peak in a molecular weight range of 300 or greater" denotes that the peaks in a molecular weight range of less than 300 are ignored. That is, the maximum peak may be present in a molecular weight range of less than 300, but the maximum peak here is a maximum peak when seen only in a molecular weight range of 300 or greater.

The measurement conditions in the GPC measurement according to the present embodiment are not particularly limited, but for example, conditions described in Examples can be used, and the molecular weight can be specified by using standard polystyrene.

The silicone-based surfactant A is not particularly limited, and examples thereof include a polysiloxane-based compound such as dimethylsiloxane, methylphenylsiloxane, or diphenylsiloxane. These polysiloxane-based compounds may be modified organosiloxanes in which a group of a terminal or a side chain is modified with a polyether group or the like. These silicone-based surfactants A may be used alone or in combination of two or more kinds thereof.

Among these, modified organosiloxane is preferable, and polyether-modified organosiloxane is more preferable as the silicone-based surfactant A. Examples of such polyether-modified organosiloxane include modified organosiloxane in which a terminal represented by General Formula (1) is modified with a polyether group and modified organosiloxane in which a side chain represented by General Formula (3) is modified with a polyether group. When such a silicone-based surfactant A is used, coalescence or mixing of dots of the ink composition is more suppressed. In this manner, the density of an image formed of the ink composition is increased, and the optical density is likely to be further improved. Particularly, when the ink composition contains a silicone-based surfactant B described below, excellent effects can be obtained even in a case where dots of the ink composition are likely to be coalesced or mixed. Further, it is assumed that coalescence or mixing of dots of the ink composition can be suppressed because the silicone-based surfactant A has a relatively high molecular weight, but the reason for this is not limited thereto.

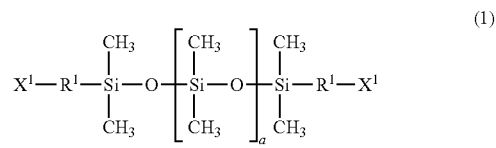

(1)

(In General Formula (1), $R^1$'s each independently represent an alkylene group having 1 or more and 6 or less carbon atoms or a single bond, $X^1$'s each independently represent a polyether group represented by General Formula (2), and a represents an integer of 10 or greater and 80 or less.)

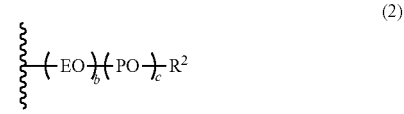

(2)

(In General Formula (2), $R^2$ represents a hydrogen atom, an alkyl group having 1 or more and 6 or less carbon atoms, or a (meth)acrylic group, EO represents an ethylene oxide group, PO represents a propylene oxide group, EO and PO are in a random order, b represents an integer of 0 or greater, c represents an integer of 0 or greater, and b+c is 1 or greater.)

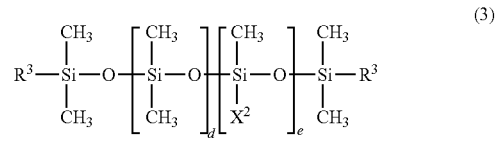

(3)

(In General Formula (3), $R^3$'s each independently represent an alkyl group having 1 or more and 6 or less carbon atoms, $X^2$'s each independently represent a polyether group represented by General Formula (4), d and e represent an integer of 1 or greater, and d+e is 2 or greater and 50 or less.)

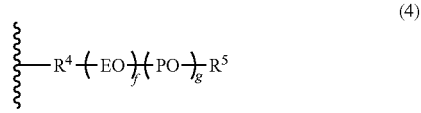

(4)

(In General Formula (4), $R^4$ represents an alkylene group having 1 or more and 6 or less carbon atoms or a single bond, $R^5$ represents a hydrogen atom or an alkyl group having 1 or more and 6 or less carbon atoms, EO represents an ethylene oxide group, PO represents a propylene oxide group, EO and PO are in a random order, f represents an integer of 0 or greater, g represents an integer of 0 or greater, and f+g is 1 or greater.)

The alkylene group having 1 or more and 6 or less carbon atoms represented by $R^1$, $R^3$, and $R^4$ is not particularly limited, and examples thereof include a methylene group, an ethylene group, a propylene group, a butylene group, a pentylene group, and hexylene group. It is preferable that $R^1$ and $R^4$ represent an alkylene group having 1 or more and 6 or less carbon atoms.

The alkyl group having 1 or more and 6 or less carbon atoms represented by $R^2$ and $R^5$ is not particularly limited, and examples thereof include a methyl group, an ethyl group, an n-propyl group, an isopropyl group, an n-butyl group, an isobutyl group, a sec-butyl group, a t-butyl group, an n-pentyl group, a neopentyl group, and an n-hexyl group.

$R^1$ and $R^4$ may represent a single bond. The single bond denotes that the atoms on the right side of $R^1$ and $R^4$ and the atoms on the left side of $R^1$ and $R^4$ are directly bonded via a single bond.

In General Formulae (1) and (2), a represents an integer of 10 to 80, preferably an integer of 20 to 70, and more preferably an integer of 30 to 60. Further, b represents an integer of 0 or greater, preferably an integer of 1 or greater, more preferably an integer of 2 to 30, and still more preferably an integer of 5 to 20. Further, c represents an integer of 0 or greater, preferably an integer of 0 to 30, and more preferably an integer of 0 to 20. In addition, b+c is an integer of 1 or greater, preferably an integer of 1 to 60, more preferably an integer of 2 to 40, and still more preferably an integer of 5 to 20.

In General Formulae (3) and (4), d and e each represent an integer of 1 or greater, preferably an integer of 5 to 40, and more preferably an integer of 10 to 20. Further, d+e is an integer of 2 to 50, preferably an integer of 5 to 40, and more preferably an integer of 10 to 30. Further, f represents an integer of 0 or greater, preferably 1 or greater, more preferably an integer of 2 to 30, and still more preferably an integer of 5 to 20. Further, g represents an integer of 0 or greater, preferably an integer of 0 to 30, and more preferably an integer of 0 to 20. In addition, f+g is an integer of 1 or greater, preferably an integer of 1 to 60, more preferably an integer of 2 to 40, and still more preferably an integer of 5 to 20.

The content of the silicone-based surfactant A is preferably 0.05% by mass or greater, preferably 5% by mass or less, more preferably 0.05% by mass or greater and 4% by mass or less, still more preferably 0.05% by mass or greater and 1.5% by mass or less, even still more preferably 0.1% by mass or greater and 1.2% by mass or less, even still more preferably 0.2% by mass or greater and 1.0% by mass or less, even still more preferably 0.4% by mass or greater and 0.6% by mass or less, even still more preferably 0.1% by mass or greater and 0.3% by mass or less, and even still more preferably 0.1% by mass or greater and 0.2% by mass or less with respect to the total amount of the ink composition. When the content of the silicone-based surfactant A is in the above-described ranges, coalescence or mixing of dots of the ink composition is more likely to be suppressed, and the visibility, the optical density, and the rub resistance of an image are likely to be further improved.

Among the examples of the silicone-based surfactant A, modified organosiloxane having a terminal modified with a polyether group, which is represented by General Formula (1), is preferable from the viewpoint that the visibility of an image is more excellent and the aggregation unevenness is more suppressed.

(2-2) Silicone-Based Surfactant B

The ink composition may further contain or preferably contains one or more kinds of silicone-based surfactants B described below. In this manner, the density of an image is likely to be further improved.

The silicone-based surfactant B is a surfactant in which the maximum peak in a molecular weight range of 300 or greater is not present in a molecular weight range of 3000 or greater in the molecular weight distribution obtained by the gel permeation chromatography and the hydrophilie-lipophile balance (HLB) value obtained by the Griffin method is 10.5 or less. When the ink composition contains such a silicone-based surfactant B, the wettability of the ink composition with respect to the recording medium is further improved, and covering properties can be further improved. Therefore, the visibility or the optical density of an image formed of the ink composition can be further improved.

The silicone-based surfactant B is a surfactant in which the maximum peak in a molecular weight range of 300 or greater is not present in a molecular weight range of 3000 or greater, and specifically, peaks are not present in a molecular weight range of 300 or greater or even when peaks are present in a molecular weight range of 300 or greater, the maximum peak is present in a molecular weight range of less than 3000. The wettability of the ink composition with respect to the recording medium is further improved, the surface of the recording medium can be sufficiently covered with the ink composition, and the visibility of the image is further improved, by using the silicone-based surfactant B that satisfies the conditions for the molecular weight. Particularly, since the recording medium is a low-absorbing recording medium or a non-absorbing recording medium, the wettability is likely to be further improved. Meanwhile, the silicone-based surfactant B can relatively further improve the rub resistance of the image as compared with the silicone-based surfactant A.

Further, the maximum peak of the silicone-based surfactant B in a molecular weight range of 300 or greater can be measured by the same method as the method for the silicone-based surfactant A.

Further, the HLB value of the silicone-based surfactant B is 10.5 or less, preferably 2.0 or greater and 10.3 or less, more preferably 3.0 or greater and 10.1 or less, and still more preferably 4.0 or greater and 10.0 or less. When the HLB value is 10.5 or less, the wettability of the ink composition with respect to the recording medium is further improved, and the visibility of the image is further improved. Further, when the HLB value is 2.0 or greater, the optical density of the image to be obtained is further improved, and the aggregation unevenness is likely to be further decreased.

Here, the HLB value is a value showing the degree of the affinity of a surfactant for water and oil, and the wettability of the ink droplets at the time of landing on a poorly absorbing base material having high hydrophobicity can be improved by setting the HLB value to be in the above-described ranges. The improvement of the wettability enables suppression of occurrence of voids or color bleeding on a base material, and thus the visibility of the image is likely to be further improved. Further, the HLB value of the present embodiment is defined and calculated by the Griffin method.

The silicone-based surfactant B is not particularly limited, and examples thereof include a polysiloxane-based compound such as dimethylsiloxane, methylphenylsiloxane, or diphenylsiloxane. Particularly, examples of the polysiloxane-based compound include modified organosiloxanes in which a group of a terminal or a side chain is modified with a polyether group or the like. These silicone-based surfactants B may be used alone or in combination of two or more kinds thereof.

Examples of the silicone-based surfactant B include a surfactant in which a in General Formula (1) is less than that of the silicone-based surfactant A contained in the ink composition. Further, other examples thereof include a surfactant in which d+e in General Formula (3) is less than that of the silicone-based surfactant A contained in the ink composition. The silicone-based surfactant B has a molecular weight that is relatively less than that of the silicone-based surfactant A contained in the ink composition.

The silicone-based surfactant B may be used alone or in combination of two or more kinds thereof. The content of the silicone-based surfactant B is preferably 0.05% by mass or greater and 5.0% by mass or less, more preferably 0.1% by mass or greater and 5.0% by mass or less, still more preferably 0.3% by mass or greater and 3.0% by mass or less, even still more preferably 0.6% by mass or greater and 1.5% by mass or less, and even still more preferably 0.4% by mass or greater and 1.0% by mass or less with respect to the total amount of the ink composition.

The visibility of the image is likely to be further improved when the content of the silicone-based surfactant B is in the above-described ranges. Further, since the silicone-based surfactant B has a property of relatively easily evaporating than the silicone-based surfactant A, the rub resistance of the image to be obtained is likely to be enhanced. Therefore, it is more preferable that the content of the silicone-based surfactant B be greater than the content of the silicone-based surfactant A.

(2-3) Other Surfactants

The ink composition may contain other surfactants. The other surfactants are not particularly limited, and examples thereof include an acetylene glycol-based surfactant, a fluorine-based surfactant, and a silicone-based surfactant other than the silicone-based surfactants A and B. The other surfactants may be used alone or in combination of two or more kinds thereof.

The acetylene glycol-based surfactant is not particularly limited, and examples thereof include 2,4,7,9-tetramethyl-5-decyne-4,7-diol, an alkylene oxide adduct of 2,4,7,9-tetramethyl-5-decyne-4,7-diol, 2,4-dimethyl-5-decyne-4-ol, and an alkylene oxide adduct of 2,4,-dimethyl-5-decyne-4-ol.

The fluorine-based surfactant is not particularly limited, and examples thereof include a perfluoroalkyl sulfonate, a perfluoroalkyl carboxylate, perfluoroalkyl phosphoric acid ester, a perfluoroalkylethylene oxide adduct, perfluoroalkyl betaine, and a perfluoroalkylamine oxide compound.

The other silicone-based surfactants are not particularly limited as long as the surfactants do not satisfy the requirements for the silicone-based surfactants A and B, and examples thereof include a polysiloxane-based compound and polyether-modified organosiloxane. Other examples of the silicone-based surfactant include SAG503A and BYK-348.

The content of the other surfactants is preferably 0.1% by mass or greater and 5.0% by mass or less, more preferably 0.3% by mass or greater and 3.0% by mass or less, and still more preferably 0.6% by mass or greater and 1.5% by mass or less with respect to the total amount of the ink composition.

Further, the total content of surfactants in the ink composition, regardless of the kind of surfactant, is preferably 2.0% by mass or less with respect to the total amount of the ink composition. An image with a higher quality can be obtained when the total content thereof is in the above-described ranges. Further, it is also preferable that the total content of the silicone-based surfactants in the ink composition be set to be in the above-described ranges.

(3) Water

The ink composition is an aqueous ink and contains water. The aqueous ink is an ink containing at least water as a main solvent component. The content of water is preferably 40% by mass or greater, more preferably 40% by mass or greater and 98% by mass or less, still more preferably 50% by mass or greater and 90% by mass or less, even still more preferably 55% by mass or greater and 85% by mass or less, even still more preferably 60% by mass or greater and 80% by mass or less, and even still more preferably 65% by mass or greater and 75% by mass or less with respect to the total amount of the ink composition.

(4) Organic Solvent

The ink composition may contain an organic solvent. Examples of the organic solvent include alcohols, alkane polyols, alkylene glycol ethers, esters, amides, sulfur-containing solvents, and cyclic ethers, and the organic solvent is not limited thereto. The alkane polyols may include alkanediols.

Examples of the alcohols include a compound in which one hydrogen atom of an alkane has been substituted with a hydroxyl group. The alkane has preferably 10 or less carbon atoms, more preferably 6 or less carbon atoms, and still more preferably 3 or less carbon atoms. Further, the alkane has 1 or more carbon atoms and preferably 2 or more carbon atoms. The alkane may be linear or branched. Examples of the alcohols include methanol, ethanol, n-propyl alcohol, iso-propyl alcohol, n-butanol, 2-butanol, tert-butanol, iso-butanol, n-pentanol, 2-pentanol, 3-pentanol, and tert-pentanol.

Examples of the alkanediols include a compound in which an alkane has been substituted with two hydroxyl groups. Specific examples of the alkanediols include ethylene glycol (also referred to as ethane-1,2-diol), propylene glycol (also referred to as propane-1,2-diol), 1,2-butanediol, 1,2-pentanediol, 1,2-hexanediol, 1,2-octanediol, 1,3-propanediol, 1,3-butylene glycol (also referred to as 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol (also referred to as isoprene glycol), 3-methyl-1,5-pentanediol, 2-ethyl-1,3-hexanediol, 3-methyl-1,5-pentanediol, 2-methylpentane-2,4-diol (also referred to as hexylene glycol), 1,6-hexanediol, 2-ethyl-2-methyl-1,3-propanediol, 2-methyl-2-propyl-1,3-propanediol, neopentyl glycol (also referred to as 2,2-dimethyl-1,3-propanediol), and pinacol (also referred to as 2,3-dimethyl-2,3-butanediol).

It is more preferable that the ink composition contain a both-terminal diol having 5 or less carbon atoms as an organic solvent among the diols described above. An image with a higher image quality can be obtained by selecting such a both-terminal diol.

Examples of the alkane polyols include alkanediols, a condensate in which two or more molecules of alkanediols have been intermolecularly condensed between hydroxyl groups, and an alkane containing three or more hydroxyl groups. The alkane polyols also include the alkanediols. The alkane polyols contain two or more hydroxyl groups in a molecule.

Examples of the condensate in which two or more molecules of alkanediols have been intermolecularly condensed between hydroxyl groups include dialkylene glycol such as diethylene glycol or dipropylene glycol and trialkylene glycol such as triethylene glycol or tripropylene glycol.

The alkane containing three or more hydroxyl groups is a compound containing three or more hydroxyl groups which has polyols having an alkane structure or a polyether structure as a skeleton. Examples thereof include those obtained by substituting polyols having an alkane structure or a polyether structure with three or more hydroxyl groups.

Examples of the alkane containing three or more hydroxyl groups include glycerin, trimethylolethane, trimethylolpropane, 1,2,5-hexanetriol, 1,2,6-hexanetriol, pentaerythritol, and polyoxypropylenetriol.

Examples of the alkylene glycol ethers include those in which one or more hydroxyl groups of the alkane polyols have been etherified. Specific examples thereof include alkylene glycol monoethers in which one hydroxyl group has been etherified and alkylene glycol diethers in which two hydroxyl groups have been etherified. Among these, alkylene glycol monoethers are more preferable. It is preferable that alkylene glycol ethers contain one or no hydroxyl group in a molecule.

Examples of the etherification include alkyl ether and aryl ether. Among these, alkyl ether is preferable. The number of carbon atoms of the ether moiety in etherification, that is, the number carbon atoms of the terminal alkoxy group is preferably 1 or more and 8 or less, more preferably 1 or more and 4 or less, still more preferably 1 or more and 3 or less, even still more preferably 1 or 2, and particularly preferably 1.

The number of carbon atoms of the alkylene glycol moiety in the alkylene glycol ethers is preferably 2 or more and 6 or less and more preferably in a range of 3 to 5. The repetition number of the alkylene glycol moiety is preferably 1 or greater and 5 or less, more preferably in a range of 1 to 3, still more preferably 1 or 2, and particularly preferably 1.

Examples of the alkylene glycol ethers include alkylene glycol monoethers and alkylene glycol diethers. Among these, alkylene glycol monoethers are more preferable. Specific examples thereof include alkylene glycol monoethers such as 2-methoxyethanol (also referred to as ethylene glycol monomethyl ether), 2-ethoxyethanol (also referred to as ethylene glycol monoethyl ether), ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether (also referred to as butyl triglycol), tetraethylene glycol monomethyl ether, tetraethylene glycol monoethyl ether, tetraethylene glycol monobutyl ether, 1-methoxy-2-propanol (also referred to as propylene glycol 1-monomethyl ether), 2-methoxypropanol (also referred to as propylene glycol 2-monomethyl ether), 1-ethoxy-2-propanol (also referred to as propylene glycol monoethyl ether), propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether, 3-methoxy-1-propanol (also referred to as 1,3-propanediol monomethyl ether), 1-methoxy-2-butanol (also referred to as 1,2-butanediol 1-monomethyl ether), 2-methoxy-1-butanol, 3-methoxy-1-butanol (also referred to as 1,3-butanediol 3-monomethyl ether), 4-methoxy-1-butanol (also referred to as 1,4-butanediol monomethyl ether), and 3-methoxy-3-methyl-1-butanol, and alkylene glycol diethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of the esters include acyclic esters and cyclic esters.

Examples of the acyclic esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

Examples of the cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, ε-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone, and a compound in which hydrogen atoms of a methylene group adjacent to a carbonyl group thereof have been substituted with an alkyl group having 1 to 4 carbon atoms.

Examples of the amides include cyclic amides and acyclic amides. Examples of the acyclic amides include alkoxy alkyl amides.

Examples of the cyclic amides include lactams, and specific examples thereof include pyrrolidones such as 2-pyrrolidone (normal boiling point of 245° C.), 1-methyl-2-pyrrolidone, 1-ethyl-2-pyrrolidone, 1-propyl-2-pyrrolidone, and 1-butyl-2-pyrrolidone, 2-piperidone, ε-caprolactam, N-methyl-ε-caprolactam, N-cyclohexyl-2-pyrrolidone, 5-methyl-2-pyrrolidone, β-propiolactam, ω-heptalactam, and succinimide. Among these, particularly, 2-pyrrolidone and ε-caprolactam are more preferable.

Examples of the acyclic amides include alkoxy alkyl amides such as 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N- diethylpropionamide, and 3-tert-butoxy-N,N-methylethylpropionamide, N,N-dimethylacetoacetamide, N,N-diethylacetoacetamide, N-methylacetoacetamide, N,N-dimethyl isobutyric acid amide, N,N-dimethylformamide, N,N-diethylformamide, N,N-dimethylacetamide, N,N-diethylacetamide, and N,N-dimethylpropionamide.

Examples of the sulfur-containing solvents include sulfoxides and sulfones. Examples of the sulfoxides include acyclic sulfoxides such as dimethyl sulfoxide and diethyl sulfoxide, and cyclic sulfoxides such as tetramethylene sulfoxide. Examples of the sulfones include cyclic sulfones such as 3-methyl sulfolane and sulfolane, and acyclic sulfones such as ethyl isopropyl sulfone, ethyl methyl sulfone, and dimethyl sulfone.

Examples of the cyclic ethers include tetrahydrofuran, 1,4-dioxane, dimethyl isosorbide, 3-methyl-3-oxetanemethanol, 3-ethyl-3-oxetanemethanol, 2-hydroxymethyloxetane, tetrahydrofurfuryl alcohol, glycerol formal, solketal, 1,4-dioxane-2,3-diol, and dihydrolevoglucosenone.

These organic solvents can be used in the form of a mixture of two or more kinds thereof as appropriate.

The normal boiling point of the organic solvent is preferably 300° C. or lower, more preferably 280° C. or lower, still more preferably 270° C. or lower, even still more preferably 250° C. or lower, even still more preferably 210° C. or lower, and particularly preferably 190° C. or lower. Further, the lower limit of the normal boiling point of the organic solvent is not particularly limited, but is preferably 100° C. or higher, more preferably 110° C. or higher, still more preferably 120° C. or higher, and even still more preferably 150° C. or higher.

Further, the drying properties of the image formed of the ink composition can be further enhanced when the ink composition contains 30.0% by mass or less of a compound having a normal boiling point of 250° C. or lower as an organic solvent. Further, examples of the organic solvent having a normal boiling point of 250° C. or lower include 2-pyrrolidone (abbreviated as 2P, normal boiling point: 245° C., classification: amides, property at 25° C.: liquid), dimethyl sulfoxide (abbreviated as DMSO, normal boiling point: 188° C., classification: sulfur-containing solvents, property at 25° C.: liquid), 3-ethyl-3-oxetanemethanol (abbreviated as EOXM, normal boiling point: 220° C., classification: cyclic ethers, property at 25° C.: liquid), 1,2-hexanediol (abbreviated as 1,2-HD, normal boiling point: 224° C., classification alkanediols, property at 25° C.: liquid), and 1,5-pentanediol (abbreviated as 1,5PD, normal boiling point: 239° C., classification: alkanediols, property at 25° C.: liquid).

The content of the organic solvent is preferably 3% by mass or greater, more preferably 10.0% by mass or greater, still more preferably 15.0% by mass or greater, and even still more preferably 20.0% by mass or greater with respect to the total mass of the ink composition. Further, the content of the organic solvent is preferably 40.0% by mass or less, more preferably 35.0% by mass or less, still more preferably 30.0% by mass or less, even still more preferably 25.0% by mass or less, and even still more preferably 20.0% by mass or less with respect to the total mass of the ink composition.

Among the examples of the organic solvent, it is more preferable that the ink composition according to the present embodiment contain alkylene glycol monoethers as an organic solvent. Further, the number of carbon atoms of the terminal alkoxy group in the alkylene glycol monoethers is preferably 1 or more and 6 or less, more preferably 1 or more and 3 or less, and still more preferably 1 or 2. Further, when alkylene glycol monoethers is used as the organic solvent, the normal boiling point thereof is preferably 100° C. or higher and 280° C. or lower, more preferably 100° C. or higher and 200° C. or lower, still more preferably 110° C. or higher and 190° C. or lower, even still more preferably 120° C. or higher and 180° C. or lower, and particularly preferably 130° C. and 170° C. or lower.

The content of the alkylene glycol monoethers is preferably 0.5% by mass or greater and 20% by mass or less, more preferably 1% by mass or greater and 15% by mass or less, still more preferably 2% by mass or greater and 10% by mass or less, and particularly preferably 3% by mass or greater and 7% by mass or less with respect to the total mass of the ink composition.

In this manner, the silicone-based surfactant A tends to suppress the wet spreadability of the ink composition and image filling (color development) tends to be degraded. Therefore, when the ink composition contains a glycol monoether solvent having a normal boiling point of 100° C. or higher and 200° C. or lower, the above-described tendency of the silicone-based surfactant A is suppressed, and an image with more enhanced wet spreadability and filling can be formed.

Examples of the normal boiling points of a plurality of alkylene glycol monoethers and the numbers of carbon atoms of the terminal alkoxy groups thereof include 2-methoxyethanol (also referred to as ethylene glycol monomethyl ether, normal boiling point: 124° C., number of carbon atoms of terminal alkoxy group (hereinafter, noted as "C"): 1), 2-ethoxyethanol (also referred to as ethylene glycol monoethyl ether, normal boiling point: 136° C., C2), 1-methoxy-2-propanol (abbreviated as PM, also referred to as propylene glycol 1-monomethyl ether, normal boiling point: 120° C., C1), 1-ethoxy-2-propanol (abbreviated as PE, also referred to as propylene glycol monoethyl ether, normal boiling point: 132° C., C2), 2-methoxypropanol (also referred to as propylene glycol 2-monomethyl ether, normal boiling point: 102° C., C1), 3-methoxy-1-propanol (also referred to as 1,3-propanediol monomethyl ether, normal boiling point: 153° C., C1), 1-methoxy-2-butanol (also referred to as 1,2-butanediol 1-monomethyl ether, normal boiling point: 135° C., C1), 2-methoxy-1-butanol (normal boiling point: 146° C., C1), 3-methoxy-1-butanol (abbreviated as MB, also referred to as 1,3-butanediol 3-monomethyl ether, normal boiling point: 158° C., C1), 4-methoxy-1-butanol (also referred to as 1,4-butanediol monomethyl ether, normal boiling point: 165° C., C1), 3-methoxy-3-methyl-1-butanol (abbreviated as MMB, normal boiling point: 174° C., C1), diethylene glycol monomethyl ether (normal boiling point: 194° C., C1), diethylene glycol monoethyl ether (normal boiling point: 202° C., C2), and dipropylene glycol monomethyl ether (abbreviated as DPM, normal boiling point: 190° C., C1).

Further, when the ink composition contains an organic solvent, the normal boiling point of the organic solvent having a highest normal boiling point among the organic solvents contained in the ink composition is more preferably 250° C. or lower, still more preferably 240° C. or lower, and even still more preferably 100° C. or higher and 230° C. or lower. In this manner, an image with a higher image quality can be obtained.

(5) Resin Particles

The ink composition may further contain resin particles. The rub resistance is likely to be further improved when resin particles are used. The resin particles are not particularly limited, and examples thereof include resin particles consisting of a urethane-based resin, an acrylic resin (including a styrene-acrylic resin), a fluorene-based rein, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, and an ethylene vinyl acetate-based resin. The resin particles may be in the form of an emulsion.

Among these, acrylic resin particles, urethane-based resin particles, or polyester-based resin particles are preferable. The rub resistance is likely to be further improved by using such resin particles. These resin particles are handled in the form of an emulsion in many cases, but may have a property of powder. Further, the resin particles may be used alone or in combination of two or more kinds thereof.

The urethane-based resin is a generic term for resins having a urethane resin. A polyether type urethane resin having an ether bond in the main chain, a polyester type urethane resin having an ether bond in the main chain, or a polycarbonate type urethane resin having a carbonate bond in the main chain may be used as the urethane-based resin in place of the urethane bond.

The acrylic resin is a generic term for polymers obtained by polymerizing at least an acrylic monomer such as (meth) acrylic acid or (meth)acrylic acid ester as one component, and examples thereof include a resin obtained from an acrylic monomer and a copolymer of an acrylic monomer and a monomer other than the acrylic monomer. Specific examples thereof include an acryl-vinyl-based resin that is a copolymer of an acrylic monomer and a vinyl-based monomer. Further, examples of the vinyl-based monomer include styrene. As the acrylic monomer, acrylamide, acrylonitrile, or the like can be used.

Among these, an acrylic resin is preferable, and a styrene-acrylic resin is more preferable. The styrene-acrylic resin is not particularly limited, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer. The rub resistance of a recorded material to be obtained is likely to be further improved by using such resins.

The polyolefin-based resin is a resin that has an olefin such as ethylene, propylene, or butylene in a structure skeleton, and can be appropriately selected from known resins.

The content of the resin particles is preferably 0.5% by mass or greater and 6.0% by mass or less, more preferably 1.0% by mass or greater and 5.0% by mass or less, and still more preferably 2.0% by mass or greater and 4.0% by mass or less with respect to the total mass of the ink composition. The rub resistance is likely to be further improved when the content of the resin particles is in the above-described ranges.

(6) Wax

The ink composition may contain wax. The wax is not particularly limited and examples thereof include hydrocarbon wax and ester wax which is a condensate of fatty acid and monohydric alcohol or polyhydric alcohol. The hydrocarbon wax is not particularly limited, and examples thereof include paraffin wax, and polyolefin wax such as polyethylene wax or polypropylene wax. The wax may be used alone or in combination of two or more kinds thereof. Among the examples of the wax, from the viewpoint of improving the rub resistance, hydrocarbon wax is preferable, polyolefin wax is more preferable, and polyethylene wax is still more preferable.

The wax may be, for example, in a state of an emulsion in which wax particles are dispersed in water.

The content of the wax is preferably 0.1% by mass or greater and 5.0% by mass or less, more preferably 0.3% by mass or greater and 3.0% by mass or less, and still more preferably 0.6% by mass or greater and 1.5% by mass or less with respect to the total amount of the ink composition. In this manner, the rub resistance of the recorded material to be obtained is likely to be further improved.

Method of Preparing Ink Composition (7) Other Components

The ink composition may further contain various additives such as a dissolution assistant, a viscosity adjuster, a pH adjuster, an antioxidant, a preservative, a fungicide, a corrosion inhibitor, and a chelating agent as appropriate.

(8) Combination or the like of Components

It is more preferable that the ink composition contain one or more of glycol monoether that is the organic solvent described above and the silicone-based surfactant B described above. In this manner, an image with more enhanced wet spreadability and filling (color development) can be formed due to the effects of any of the components.

(9) Preparation of Ink Composition

The method of preparing the ink composition is not particularly limited, and examples thereof include a method of mixing the above-described respective components and sufficiently stirring the mixture such that the respective components are uniformly mixed.

1.1.3. Ink Jet Recording Device

An example of an ink jet recording device that can be used for a recording method according to the present embodiment will be described with reference to the accompanying drawings.

Figure 2:
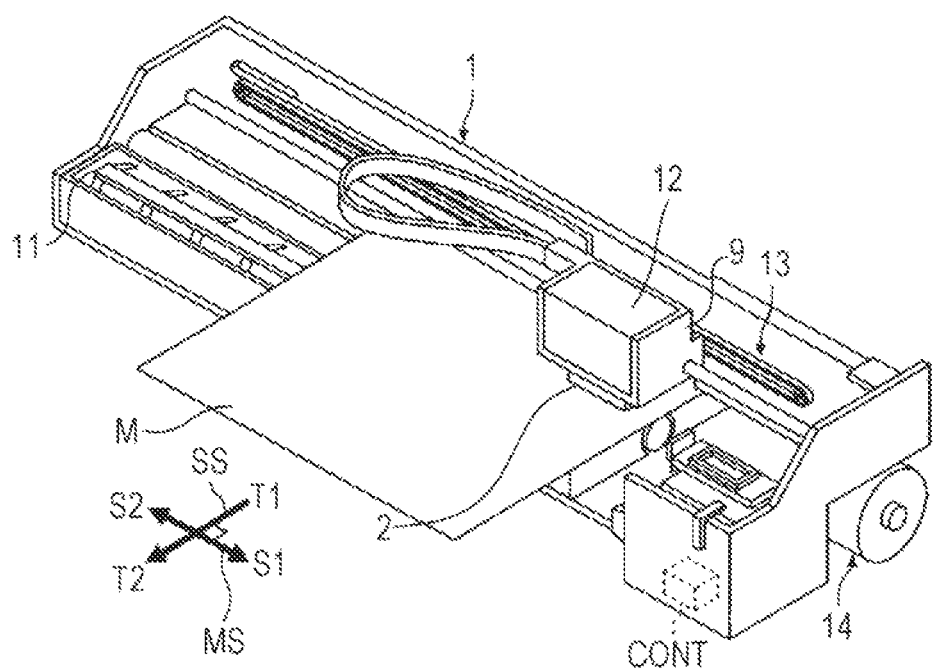
FIG. 2 is a schematic view showing the periphery of a carriage according to an example of an ink jet recording device.

FIG. 1 is a schematic cross-sectional view schematically showing an ink jet recording device. FIG. 2 is a perspective view showing an example of a configuration of the periphery of a carriage of an ink jet recording device 1 of FIG. 1. The ink jet recording device 1 includes an ink jet head 2, an IR heater 3, a platen heater 4, a heating heater 5, a cooling fan 6, a preheater 7, a ventilation fan 8, a carriage 9, a platen 11, a carriage moving mechanism 13, a transport unit 14, and a control unit CONT. The operation of the entire ink jet recording device 1 is controlled by the control unit CONT shown in FIG. 2.

The ink jet head 2 is configured to perform recording on a recording medium M by allowing the ink composition to be jetted from a nozzle of the ink jet head 2 to adhere to the recording medium M. In the present embodiment, the ink jet head 2 is a serial type ink jet head and performs scanning on the recording medium M a plurality of times in a relatively main scanning direction so that the ink adheres to the recording medium M. The ink jet head 2 is mounted on the carriage 9 shown in FIG. 2. The ink jet head 2 performs scanning on the recording medium M a plurality of times in a relatively main scanning direction due to an operation of the carriage moving mechanism 13 that allows the carriage 9 to move in a medium width direction of the recording medium M. The medium width direction is a main scanning direction of the ink jet head 2. The scanning carried out in the main scanning direction is also referred to as main scanning.

Here, the main scanning direction is a direction in which the carriage 9 on which the ink jet head 2 is mounted moves. In FIG. 1, the main scanning direction is a direction intersecting a sub-scanning direction which is a transport direction of the recording medium M indicated by an arrow SS. In FIG. 2, the width direction of the recording medium M, that is, the direction indicated by S1-S2 is a main scanning direction MS, and the direction indicated by T1→T2 is a sub-scanning direction SS. Further, scanning is performed once in the main scanning direction, that is, any one direction of the arrow S1 or the arrow S2. Further, an image is recorded on the recording medium M by repeatedly performing main scanning of the ink jet head 2 and sub-scanning which is the transport of the recording medium M a plurality of times. That is, a treatment liquid adhesion step and an ink adhesion step are performed by the main scanning of the ink jet head 2 moving in the main scanning direction a plurality of times and the sub-scanning of the recording medium M moving in the sub-scanning direction intersecting the main scanning direction a plurality of times.

The cartridge 12 that supplies each of ink compositions to the ink jet head 2 includes a plurality of independent cartridges. The cartridge 12 is detachably attached to the carriage 9 on which the ink jet head 2 is mounted. A plurality of cartridges are respectively filled with different kinds of ink compositions, and the ink compositions are supplied to respective nozzles from the cartridge 12. In the present embodiment, an example in which the cartridge 12 is attached to the carriage 9, but the present disclosure is not limited thereto, and a form in which the cartridge 12 is provided at a position other than the carriage 9 and the ink compositions are supplied to respective nozzles through supply pipes (not shown) may be employed.

The ink composition can be jetted from the ink jet head 2 using a known method of the related art. In the present embodiment, a method of jetting liquid droplets using vibration of a piezoelectric element, that is, a jetting method of forming ink droplets by mechanical deformation of an electrostrictive element is used.

The ink jet recording device 1 includes the ventilation fan 8, the IR heater 3, and the platen heater 4 that are used for drying the ink composition jetted from the ink jet head 2 to be allowed to adhere to the recording medium M. A primary drying step can be performed by appropriately combining the ventilation fan 8, the IR heater 3, and the platen heater 4. The recording medium M is not necessarily dried in the primary drying step, and the primary drying step may be performed such that the ventilation fan 8 is used alone for air blast at room temperature.

Further, when the IR heater 3 is used, the recording medium M can be heated in a radiation manner by infrared rays radiated from the ink jet head 2 side. In this manner, the ink jet head 2 is also likely to be heated simultaneously, but the temperature can be increased without being affected by the thickness of the recording medium M as compared to when the ink jet head 2 is heated from the rear surface of the recording medium M using the platen heater 4 or the like. Further, the ink jet recording device may include various fans (such as the ventilation fan 8) that apply hot air or air at the same temperature as the temperature of the environment to the recording medium M to dry the ink on the recording medium M.

The platen heater 4 can heat the recording medium M at a position opposing to the ink jet head 2 via the platen 11 such that the ink composition jetted by the ink jet head 2 can be dried fast from when the ink composition adheres to the recording medium M. The platen heater 4 is capable of heating the recording medium M in a conduction manner, and the ink composition may be allowed to adhere to the recording medium M heated in the above-described manner using the recording method according to the present embodiment. In this case, the ink composition can be rapidly fixed on the recording medium M, and the image quality can be improved.

The heating heater 5 is a heater for drying and solidifying the ink composition adhered to the recording medium M, that is, a heater for performing secondary heating or secondary drying. The heating heater 5 can be used in a post-drying step. When the recording medium M on which an image has been recorded is heated by the heating heater 5, the moisture, the organic solvent, and the like contained in the ink composition are more rapidly evaporated and scattered, and an ink film is formed by a resin that can be contained in the ink composition. In this manner, the ink film is firmly fixed or bonded onto the recording medium M, so that the film forming properties are enhanced, and thus an image with a high image quality can be obtained in a short time.

The ink jet recording device 1 may include the cooling fan 6. An ink coating film can be formed on the recording medium M with excellent adhesiveness by drying the ink composition recorded on the recording medium M and cooling the ink composition on the recording medium M with the cooling fan 6.

Further, the ink jet recording device 1 may include the preheater 7 that heats the recording medium M in advance before the adhesion of the ink composition to the recording medium M. The ink jet recording device 1 may further include the ventilation fan 8 such that the ink composition adhered to the recording medium M is more effectively dried.

The ink jet recording device 1 includes the platen 11 that supports the recording medium M, the carriage moving mechanism 13 that moves the carriage 9 relatively with respect to the recording medium M, and the transport unit 14 that is a roller transporting the recording medium M in the sub-scanning direction, below the carriage 9. The operations of the carriage moving mechanism 13 and the transport unit 14 are controlled by the control unit CONT.

The ink jet recording device exemplified above can be preferably used to perform the recording method according to the present embodiment. Further, a serial type ink jet recording device is shown in FIGS. 1 and 2, but a line type ink jet recording device can also be used for the recording method according to the present embodiment.

1.1.4. Specific Aspect of Adhesion Step

The adhesion step can be easily performed by jetting the ink from the ink jet head 2 using the ink jet recording device 1 shown in FIG. 1 which is an embodiment of the ink jet recording device described above.

The recording method of the present embodiment includes the following aspects in regard to the procedures for the adhesion of the ink composition. Further, "main scanning" is also simply referred to as scanning and denotes an operation of jetting the ink composition from the ink jet head to make the ink composition adhere to the recording medium while moving the position of the ink jet head relatively with respect to the recording medium. The ink jet head can be mounted, for example, on the carriage. The ink jet head may be allowed to move by moving the carriage. That is, the ink jet head moves even in this case.

Further, "main scanning direction" is a movement direction of a relative position of the ink jet head with respect to the recording medium, and in a case of a serial type ink jet head, the main scanning direction is a width direction of the recording medium. Further, "main scanning" is a movement of a relative position of the ink jet head with respect to the recording medium, and the ink jet head may move with respect to the recording medium, or the recording medium may move with respect to the ink jet head. The direction of movement of such a relative position is a main scanning direction. The movement of a relative position of the ink jet head with respect to the recording medium can also be referred to as a movement of a relative position of the recording medium with respect to the ink jet head, that is, the movement of relative positions of the ink jet head and the recording medium.

Meanwhile, "sub-scanning" denotes an operation of moving relative positions of the ink jet head and the recording medium in the sub-scanning direction. Here, "sub-scanning direction" is a direction intersecting the main scanning direction.

For example, the recording can be performed by repeating an operation of making the ink composition adhere to a certain region on the recording medium in the main scanning, slightly moving, for example, the recording medium in the sub-scanning, and performing the subsequent main scanning so that the ink composition adheres to the recording medium in a state of being adjacent to or partially overlapping with the ink composition adhered in advance. Further, "sub-scanning" also denotes a movement of a relative position of the ink jet head with respect to the recording medium, and the ink jet head may move with respect to the recording medium or the recording medium may move with respect to the ink jet head. The direction of such relative movement is a sub-scanning direction. The sub-scanning is not scanning and is not an operation of jetting the ink and making the ink composition to adhere to the recording medium.

As described above, the recording method of the present embodiment can be performed by respectively performing the main scanning and the sub-scanning a plurality of times. Further, the recording method of the present embodiment can be performed by repeatedly performing the main scanning and the sub-scanning alternately.

The adhesion step of the present embodiment is performed by scanning (main scanning) that is carried out a plurality of times by jetting the ink composition to make the ink composition adhere to the recording medium while moving the relative position of the ink jet head with respect to the recording medium, and the scanning is performed seven times or less on an identical region of the recording medium. In a case of a line type ink jet head, the scanning is performed once.

In other words, liquid droplets of the ink composition are allowed to adhere to a certain region on the recording medium by carrying out one main scanning, and liquid droplets of the ink composition may be allowed to adhere to the region in a state of being superimposed on the adhered ink composition by carrying out another main scanning, and the number of times of superimposition is 7 times or less. In this case, the main scanning for allowing the ink composition to adhere to the recording medium is carried out such that the ink jet head passes over the same region seven times or less. In this manner, the speed of forming the recorded material can be increased, and thus the productivity can be increased.

Further, when an image is recorded on an arbitrary region, the number of times the ink jet head has passed over the region is referred to as "pass number" or "scanning number". For example, when the main scanning for allowing the ink composition to adhere to the identical region is performed on the region four times, it can be said that "pass number is four" or "scanning number is four".

For example, when the length of one sub-scanning in the sub-scanning direction is ¼ of the length in the sub-scanning direction of the nozzle array arranged in the sub-scanning direction of the ink jet head, the main scanning is performed four times on the identical portion (identical scanning region) in a rectangular scanning region extending in the main scanning direction with a length of one sub-scanning in the sub-scanning direction. The number of times of scanning as viewed in the above-described manner is referred to as the scanning number or the pass number. The number of times of scanning is preferably 7 or less, more preferably 6 or less, and still more preferably 2 or greater and 5 or less.

The adhesion amount of the ink composition is preferably 2.0 mg/inch$^2$ or greater and 20 mg/inch$^2$ and more preferably 3.0 mg/inch$^2$ or greater and 10 mg/inch$^2$ per unit area of the region where the ink composition is adhered on the recording medium (hereinafter, also referred to as "adhesion region of the ink composition"). The area for verifying the adhesion amount is, for example, an area of approximately 2 mm×2 mm. The image quality of the recorded material to be obtained is likely to be further enhanced when the adhesion amount of the ink composition is in the above-described ranges.

In the main-scanning, the time of the main scanning once is preferably 0.5 seconds or longer and 5 seconds or shorter, more preferably 1 second or longer and 4 seconds or shorter, and still more preferably 2 seconds or longer and 3 seconds or shorter. The time of the main scanning once (also referred to as "time of the main scanning") is a time required for the location where the head is present to move from a position of the recording medium facing one end portion to a position of the recording medium facing the other end portion in the main scanning once.

1.2. Other Steps

The recording method of the present embodiment may include the following steps in addition to the adhesion step.

1.2.1. Primary Drying Step

The recording method of the present embodiment may include a primary drying step of drying the ink composition adhered to the recording medium with a drying mechanism. The primary drying step is a step of drying the ink composition by heating the recording medium before the adhesion step or heating the recording medium or performing air blast to the recording medium during the adhesion step or at an early stage after the adhesion of the ink composition to the recording medium. The primary drying step is a step for drying at least a part of the solvent component in the ink composition to the extent that at least the flow of the ink composition adhered to the recording medium is reduced.

The primary drying step may be carried out such that the ink composition adheres to the heated recording medium or the primary drying step may be carried out at an early stage after the adhesion so that the drying is promoted. It is preferable that the primary drying step be carried out such that the ink droplets (dots) having landed on the recording medium start drying within 0.5 seconds at the latest from the landing of the ink droplets. A drying unit (drying mechanism) for drying the ink composition of the recording medium is not particularly limited, and examples thereof include a conduction type drying unit such as a platen heater having a heating function, a radiation type drying unit such as an IR heater, and a blast type drying unit such as a heating fan or a fan without a heating function.

Examples of the kind of the drying mechanism include a conduction type drying mechanism that conducts heat to the recording medium from a member in contact with the recording medium so that the recording medium is heated, a radiation type heating mechanism that radiates radiation such as IR to the recording medium so that the recording medium is heated, and a blast type drying mechanism that blows air to the recording medium. The blast type drying mechanism is carried out, for example, by a method of applying air to the recording medium and heating the recording medium using hot air at the same time or a method of promoting drying of the ink with air at room temperature without heating the recording medium. The method without heating the recording medium is preferable from the viewpoint of suppressing the jetting stability from being degraded due to drying of the ink composition in the nozzles of the ink jet head. It is preferable to use a combination of a blast type drying mechanism and any of the conduction type drying mechanism or the radiation type conduction mechanism. In a case of a combination, the blast type drying mechanism may be used by the method without heating the recording medium, which is preferable.

The surface temperature of the recording medium in the primary drying step is preferably 50° C. or lower, more preferably 45° C. or lower, still more preferably 30° C. or higher and 42° C. or lower, even still more preferably 32° C. or higher and 40° C. or lower, even still more preferably 35° C. or higher and 48° C. or lower, and even still more preferably 40° C. or higher and 45° C. or lower.

When the surface temperature of the recording medium is in the above-described ranges, the drying properties are likely to be further improved, coalescence or mixing of dots of the ink composition are likely to be further suppressed, the image unevenness is likely to be suppressed, the visibility or the optical density is likely to be further improved, and the rub resistance of a recorded material to be obtained is likely to be further improved.

When the blast type drying mechanism is used, the air speed in the vicinity of the recording medium is preferably 0.5 m/s or greater and 15 m/s or less, more preferably 1 m/s or greater and 10 m/s or less, and still more preferably 2 m/s or greater and 5 m/s or less. The air temperature is preferably 45° C. or lower, more preferably 40° C. or lower, still more preferably 32° C. or lower, and particularly preferably 20° C. or higher and 27° C. or lower. In this manner, an image with a higher image quality can be obtained.

1.2.2. Secondary Drying Step

The secondary drying step is a step of heating the recording medium after the adhesion step. The secondary drying step is a step of sufficiently heating the recording medium to the extent that the recording material can be used by completing the recording. The secondary drying step is a step of sufficiently drying the solvent component of the ink composition and heating the resin, the wax, and the like contained in the ink composition to flatten the coating film of the ink composition. It is preferable that the secondary drying step be started more than 0.5 seconds after the adhesion of the ink composition to the recording medium. For example, it is preferable that a recording region where the recording medium is present be started heating more than 0.5 seconds after completion of the adhesion of the ink composition to the region. The surface temperature of the low-absorbing recording medium or the non-absorbing recording medium is preferably 50° C. or higher and 100° C. or lower, more preferably 60° C. or higher and 90° C. or lower, and still more preferably 70° C. or higher and 80° C. or lower. When the surface temperature of the recording medium is in the above-described ranges, the rub resistance of the recorded material to be obtained is likely to be further improved. A conduction type drying mechanism, a radiation type drying mechanism, or a blast type drying mechanism, or the like can be used as the secondary drying mechanism.

1.3. Effects

According to the recording method of the present embodiment, since an ink composition containing the silicone-based surfactant A having a specific molecular weight distribution is used, aggregation unevenness of dots of the ink composition can be reduced and thus an image with an excellent image quality can be obtained while the recording speed is increased even when the number of passes during recording on the low-absorbing recording medium or the non-absorbing recording medium is set to 7 times or less, which is small.

According to the recording method of the present embodiment, since the ink composition contains a relatively high-molecular silicone-based surfactant A, the aggregation unevenness of dots can be reduced, and an image with an excellent image quality can be obtained while the recording speed is increased even when the number of passes is decreased. The reason for this is assumed to be that the relatively high-molecular silicone surfactant A suppresses the ink composition from flowing, and thus the aggregation unevenness can be reduced. The effect of reducing the fluidity of the ink composition is high particularly when the concentration of the solid content component is increased as a result of evaporation of the solvent component in the ink composition on the recording medium. This effect can also be referred to as a pinning effect of the ink composition on the recording medium.

Further, satisfactory results are obtained by the present recording method even with a line type printer corresponding to one pass printing.

Further, the silicone-based surfactant A is somewhat inferior in terms of wet spreadability of the ink composition and thus the filling (color development, OD value) may be degraded, but the wet spreadability of the silicone-based surfactant A can be sufficiently compensated when the ink composition contains glycol monoethers and a silicone-based surfactant B. Therefore, the filling (color development, OD value) can be further improved. This is considered to be based on the mechanism that the fluidity is reduced by the silicone-based surfactant A to prevent aggregation unevenness when evaporation of the ink composition proceeds after wetting and spreading of the ink composition due to the glycol monoethers and/or the silicone-based surfactant B. Further, it is considered that this effect is also caused because the glycol monoethers are easy to evaporate on the recording medium and the wet spreadability is extremely reduced after the wetting and spreading of the ink composition.

2. Examples and Comparative Examples

Hereinafter, the present disclosure will be described in more detail based on the following examples, but the present disclosure is not limited thereto. Hereinafter, "%" is on a mass basis unless otherwise specified.

2.1. Preparation of Ink Composition

Ink compositions were obtained by mixing respective components to have the compositions listed in Tables 1 to 3. Further, the compositions listed in Tables 1 to 3 are in units of % by mass. Further, the pigments and the resin particles in the tables are solid contents. In addition, the pigment and the dispersant which was a water-soluble styrene acrylic resin were mixed in advance in water at a mass ratio (pigment:dispersant) of 2:1, the mixture was stirred to prepare a pigment dispersion liquid, and this pigment dispersion liquid was used to prepare an ink composition. Ion exchange water was added thereto such that the total mass of the treatment liquid reached 100% by mass.

TABLE 1

| | | b.p. | Ink C01 | C02 | C03 | C04 | C05 | C06 |
|---|---|---|---|---|---|---|---|---|
| Coloring material | P.B.15:3 | — | 4.0 | 4.0 | 4.0 | 4.0 | 4.0 | 4.0 |
| Fixing resin | Styrene acrylic resin | — | 3.0 | 3.0 | 3.0 | 3.0 | 3.0 | 3.0 |
| Wax | Polyethylene wax | — | 1.0 | 1.0 | 1.0 | 1.0 | 1.0 | 1.0 |
| Organic solvent | Propylene glycol | 188 | 15.0 | 15.0 | 15.0 | 15.0 | 15.0 | 15.0 |
| | 1,2-Butanediol | 193 | — | — | — | — | — | — |
| | 1,3-Butanediol | 207 | — | — | — | — | — | — |
| | 1,5-Pentanediol | 239 | — | — | — | — | — | — |
| | Glycerin | 290 | — | — | — | — | — | — |
| | 2-Pyrrolidone | 245 | — | — | — | — | — | — |
| | 1,2-Hexanediol | 223 | 4.0 | 4.0 | 4.0 | 4.0 | 4.0 | 4.0 |
| Surfactant A | BYK333 (maximum peak: 6760) | — | 0.5 | — | — | 1.0 | 1.5 | 0.5 |
| | Preparation Example 1 (maximum peak: 6500) | — | — | 0.5 | — | — | — | — |
| | BYK3480 (maximum peak: 4330) | — | — | — | 0.5 | — | — | — |
| Surfactant B | KF-6204 (HLB = 10) | — | — | — | — | — | — | 1.0 |
| | Tegowet280 (HLB = 3.5) | — | — | — | — | — | — | — |
| Other surfactants | SAG503A (HLB = 11) | — | — | — | — | — | — | — |
| | PD002W | — | — | — | — | — | — | — |
| Glycol monoether | 3-Methoxy-1-butanol | 158 | — | — | — | — | — | — |
| | 3-Methoxy-1-propanol | 153 | — | — | — | — | — | — |
| | 3-Methoxy-3-methyl-1-butanol | 174 | — | — | — | — | — | — |
| | Butyl triglycol | 278 | — | — | — | — | — | — |
| Other wet solvents | Ethanol | 78 | — | — | — | — | — | — |
| | 1-Propanol | 97 | — | — | — | — | — | — |
| Water | Ion exchange water | — | Remainder | Remainder | Remainder | Remainder | Remainder | Remainder |
| Total | | | 100 | 100 | 100 | 100 | 100 | 100 |
| Total amount of organic solvents | | | 19.0 | 19.0 | 19.0 | 19.0 | 19.0 | 19.0 |
| Ratio of solvent having boiling point of lower than 200° C. (% by mass, with respect to total amount of organic solvents) | | | 79.0 | 79.0 | 79.0 | 79.0 | 79.0 | 79.0 |
| Total amount of surfactants | | | 0.5 | 0.5 | 0.5 | 1.0 | 1.5 | 1.5 |

| | | b.p. | Ink C07 | C08 | C09 | C10 |
|---|---|---|---|---|---|---|
| Coloring material | P.B.15:3 | — | 4.0 | 4.0 | 4.0 | 4.0 |
| Fixing resin | Styrene acrylic resin | — | 3.0 | 3.0 | 3.0 | 3.0 |
| Wax | Polyethylene wax | — | 1.0 | 1.0 | 1.0 | 1.0 |
| Organic solvent | Propylene glycol | 188 | 15.0 | 15.0 | 15.0 | 15.0 |
| | 1,2-Butanediol | 193 | — | — | — | — |
| | 1,3-Butanediol | 207 | — | — | — | — |
| | 1,5-Pentanediol | 239 | — | — | — | — |
| | Glycerin | 290 | — | — | — | — |
| | 2-Pyrrolidone | 245 | — | — | — | — |
| | 1,2-Hexanediol | 223 | 4.0 | 4.0 | 4.0 | 4.0 |
| Surfactant A | BYK333 (maximum peak: 6760) | — | 0.5 | 0.5 | 0.5 | 0.5 |
| | Preparation Example 1 (maximum peak: 6500) | — | — | — | — | — |
| | BYK3480 (maximum peak: 4330) | — | — | — | — | — |
| Surfactant B | KF-6204 (HLB = 10) | — | 2.0 | — | — | — |
| | Tegowet280 (HLB = 3.5) | — | — | 1.0 | — | — |
| Other surfactants | SAG503A (HLB = 11) | — | — | — | 1.0 | — |
| | PD002W | — | — | — | — | 1.0 |
| Glycol monoether | 3-Methoxy-1-butanol | 158 | — | — | — | — |
| | 3-Methoxy-1-propanol | 153 | — | — | — | — |
| | 3-Methoxy-3-methyl-1-butanol | 174 | — | — | — | — |
| | Butyl triglycol | 278 | — | — | — | — |
| Other wet solvents | Ethanol | 78 | — | — | — | — |
| | 1-Propanol | 97 | — | — | — | — |
| Water | Ion exchange water | — | Remainder | Remainder | Remainder | Remainder |
| Total | | | 100 | 100 | 100 | 100 |
| Total amount of organic solvents | | | 19.0 | 19.0 | 19.0 | 19.0 |
| Ratio of solvent having boiling point of lower than 200° C. (% by mass, with respect to total amount of organic solvents) | | | 79.0 | 79.0 | 79.0 | 79.0 |
| Total amount of surfactants | | | 2.5 | 1.5 | 1.5 | 1.5 |

TABLE 2

|  |  | b.p. | Ink C11 | C12 | C13 | C14 | C15 | C16 |
|---|---|---|---|---|---|---|---|---|
| Coloring material | P.B.15:3 | — | 4.0 | 4.0 | 4.0 | 4.0 | 4.0 | 4.0 |
| Fixing resin | Styrene acrylic resin | — | 3.0 | 3.0 | 3.0 | 3.0 | 3.0 | 3.0 |
| Wax | Polyethylene wax | — | 1.0 | 1.0 | 1.0 | 1.0 | 1.0 | 1.0 |
| Organic solvent | Propylene glycol | 188 | 10.0 | 10.0 | 10.0 | 10.0 | 10.0 | 10.0 |
|  | 1,2-Butanediol | 193 | — | — | — | — | — | — |
|  | 1,3-Butenediol | 207 | — | — | — | — | — | — |
|  | 1,5-Pentanediol | 239 | — | — | — | — | — | — |
|  | Glycerin | 290 | — | — | — | — | — | — |
|  | 2-Pyrrolidone | 245 | — | — | — | — | — | — |
|  | 1,2-Hexanediol | 223 | 4.0 | 4.0 | 4.0 | 4.0 | 4.0 | 4.0 |
| Surfactant A | BYK333 (maximum peak: 6760) | — | 0.5 | 0.5 | 0.5 | 0.5 | 0.5 | 0.5 |
|  | Preparation Example 1 (maximum peak: 6500) | — | — | — | — | — | — | — |
|  | BYK3480 (maximum peak: 4330) | — | — | — | — | — | — | — |
| Surfactant B | KF-6204 (HLB = 10) | — | — | 0.5 | 0.5 | 0.5 | 0.5 | 0.5 |
|  | Tegowet280 (HLB = 3.5) | — | — | — | — | — | — | — |
| Other surfactants | SAG503A (HLB = 11) | — | — | — | — | — | — | — |
|  | PD002W | — | — | — | — | — | — | — |
| Glycol monoether | 3-Methoxy-1-butanol | 158 | 5.0 | 5.0 | — | — | — | — |
|  | 3-Methoxy-1-propanol | 153 | — | — | 5.0 | — | — | — |
|  | 3-Methoxy-3-methyl-1-butanol | 174 | — | — | — | 5.0 | — | — |
|  | Butyl triglycol | 278 | — | — | — | — | — | — |
| Other wet solvents | Ethanol | 78 | — | — | — | — | 5.0 | — |
|  | 1-Propanol | 97 | — | — | — | — | — | 5.0 |
| Water | Ion exchange water |  | Remainder | Remainder | Remainder | Remainder | Remainder | Remainder |
| Total |  |  | 100 | 100 | 100 | 100 | 100 | 100 |
| Total amount of organic solvents |  |  | 19.0 | 19.0 | 19.0 | 19.0 | 19.0 | 19.0 |
| Ratio of solvent having boiling point of lower than 200° C. (% by mass, with respect to total amount of organic solvents) |  |  | 79.0 | 79.0 | 79.0 | 79.0 | 79.0 | 79.0 |
| Total amount of surfactants |  |  | 0.5 | 1.0 | 1.0 | 1.0 | 1.0 | 1.0 |

|  |  | b.p. | Ink C17 | C18 | C19 | C20 |
|---|---|---|---|---|---|---|
| Coloring material | P.B.15:3 | — | 4.0 | 4.0 | 4.0 | 4.0 |
| Fixing resin | Styrene acrylic resin | — | 3.0 | 3.0 | 3.0 | 3.0 |
| Wax | Polyethylene wax | — | 1.0 | 1.0 | 1.0 | 1.0 |
| Organic solvent | Propylene glycol | 188 | 12.0 | 10.0 | 10.0 | 10.0 |
|  | 1,2-Butanediol | 193 | — | — | — | — |
|  | 1,3-Butenediol | 207 | — | — | — | — |
|  | 1,5-Pentanediol | 239 | — | — | — | — |
|  | Glycerin | 290 | — | — | — | — |
|  | 2-Pyrrolidone | 245 | — | — | — | — |
|  | 1,2-Hexanediol | 223 | 4.0 | 4.0 | 4.0 | 4.0 |
| Surfactant A | BYK333 (maximum peak: 6760) | — | 0.5 | — | — | — |
|  | Preparation Example 1 (maximum peak: 6500) | — | — | — | — | — |
|  | BYK3480 (maximum peak: 4330) | — | — | — | — | — |
| Surfactant B | KF-6204 (HLB = 10) | — | — | 0.5 | 0.5 | — |
|  | Tegowet280 (HLB = 3.5) | — | — | — | — | — |
| Other surfactants | SAG503A (HLB = 11) | — | — | — | 0.5 | 0.5 |
|  | PD002W | — | — | — | — | — |
| Glycol monoether | 3-Methoxy-1-butanol | 158 | 3.0 | 5.0 | 5.0 | — |
|  | 3-Methoxy-1-propanol | 153 | — | — | — | — |
|  | 3-Methoxy-3-methyl-1-butanol | 174 | — | — | — | — |
|  | Butyl triglycol | 278 | — | — | — | — |
| Other wet solvents | Ethanol | 78 | — | — | — | — |
|  | 1-Propanol | 97 | — | — | — | — |
| Water | Ion exchange water |  | Remainder | Remainder | Remainder | Remainder |
| Total |  |  | 100 | 100 | 100 | 100 |
| Total amount of organic solvents |  |  | 19.0 | 19.0 | 19.0 | 14.0 |
| Ratio of solvent having boiling point of lower than 200° C. (% by mass, with respect to total amount of organic solvents) |  |  | 79.0 | 79.0 | 79.0 | 71.0 |
| Total amount of surfactants |  |  | 1.0 | 0.5 | 0.5 | 0.5 |

TABLE 3

|  |  | b.p. | Ink C21 | C22 | C23 | C24 | C25 | C26 |
|---|---|---|---|---|---|---|---|---|
| Coloring material | P.B.15:3 | — | 4.0 | 4.0 | 4.0 | 4.0 | 4.0 | 4.0 |
| Fixing resin | Styrene acrylic resin | — | 3.0 | 3.0 | 3.0 | 3.0 | 3.0 | 3.0 |
| Wax | Polyethylene wax | — | 1.0 | 1.0 | 1.0 | 1.0 | 1.0 | 1.0 |
| Organic solvent | Propylene glycol | 188 | 15.0 | 15.0 | 10.0 | 23.0 | — | — |
|  | 1,2-Butanediol | 193 | — | — | — | — | 15.0 | — |
|  | 1,3-Butanediol | 207 | — | — | — | — | — | 15.0 |
|  | 1,5-Pentanediol | 239 | — | — | — | — | — | — |
|  | Glycerin | 290 | — | — | — | — | — | — |
|  | 2-Pyrrolidone | 245 | — | — | — | — | — | — |
|  | 1,2-Hexanediol | 223 | 4.0 | 4.0 | 4.0 | 4.0 | 4.0 | 4.0 |
| Surfactant A | BYK333 (maximum peak: 6760) | — | 0.2 | 0.5 | 0.5 | 0.5 | 0.5 | 0.5 |
|  | Preparation Example 1 (maximum peak: 6500) | — | — | — | — | — | — | — |
|  | BYK3480 (maximum peak: 4330) | — | — | 0.5 | 0.5 | — | — | — |
| Surfactant B | KF-6204 (HLB = 10) | — | — | — | — | — | — | — |
|  | Tegowet280 (HLB = 3.5) | — | — | — | — | — | — | — |
| Other surfactants | SAG503A (HLB = 11) | — | — | — | — | — | — | — |
|  | PD002W | — | — | — | — | — | — | — |
| Glycol monoether | 3-Methoxy-1-butand | 158 | — | — | — | — | — | — |
|  | 3-Methoxy-1-propanol | 153 | — | — | — | — | — | — |
|  | 3-Methoxy-3-methyl-1-butanol | 174 | — | — | — | — | — | — |
|  | Butyl triglycol | 278 | — | — | 5.0 | — | — | — |
| Other wet solvents | Ethanol | 78 | — | — | — | — | — | — |
|  | 1-Propanol | 97 | — | — | — | — | — | — |
| Water | Ion exchange water | — | Remainder | Remainder | Remainder | Remainder | Remainder | Remainder |
| Total |  |  | 100 | 100 | 100 | 100 | 100 | 100 |
| Total amount of organic solvents |  |  | 19.0 | 19.0 | 19.0 | 19.0 | 19.0 | 19.0 |
| Ratio of solvent having boiling point of lower than 200° C. (% by mass, with respect to total amount of organic solvents) |  |  | 79.0 | 79.0 | 53.0 | 79.0 | 79.0 | 0.0 |
| Total amount of surfactants |  |  | 0.2 | 1.0 | 1.0 | 0.5 | 0.5 | 0.5 |

|  |  | b.p. | Ink C27 | C28 | C29 | C30 |
|---|---|---|---|---|---|---|
| Coloring material | P.B.15:3 | — | 4.0 | 4.0 | 4.0 | 4.0 |
| Fixing resin | Styrene acrylic resin | — | 3.0 | 3.0 | 3.0 | 3.0 |
| Wax | Polyethylene wax | — | 1.0 | 1.0 | 1.0 | 1.0 |
| Organic solvent | Propylene glycol | 188 | — | 9.0 | 13.0 | 10.0 |
|  | 1,2-Butanediol | 193 | — | — | — | — |
|  | 1,3-Butanediol | 207 | — | 6.0 | — | — |
|  | 1,5-Pentanediol | 239 | 15.0 | — | — | — |
|  | Glycerin | 290 | — | — | 2.0 | — |
|  | 2-Pyrrolidone | 245 | — | — | — | 5.0 |
|  | 1,2-Hexanediol | 223 | 4.0 | 4.0 | 4.0 | 4.0 |
| Surfactant A | BYK333 (maximum peak: 6760) | — | 0.5 | 0.5 | 0.5 | 0.5 |
|  | Preparation Example 1 (maximum peak: 6500) | — | — | — | — | — |
|  | BYK3480 (maximum peak: 4330) | — | — | — | — | — |
| Surfactant B | KF-6204 (HLB = 10) | — | — | — | — | — |
|  | Tegowet280 (HLB = 3.5) | — | — | — | — | — |
| Other surfactants | SAG503A (HLB = 11) | — | — | — | — | — |
|  | PD002W | — | — | — | — | — |
| Glycol monoether | 3-Methoxy-1-butand | 158 | — | — | — | — |
|  | 3-Methoxy-1-propanol | 153 | — | — | — | — |
|  | 3-Methoxy-3-methyl-1-butanol | 174 | — | — | — | — |
|  | Butyl triglycol | 278 | — | — | — | — |
| Other wet solvents | Ethanol | 78 | — | — | — | — |
|  | 1-Propanol | 97 | — | — | — | — |
| Water | Ion exchange water | — | Remainder | Remainder | Remainder | Remainder |
| Total |  |  | 100 | 100 | 100 | 100 |
| Total amount of organic solvents |  |  | 19.0 | 19.0 | 19.0 | 19.0 |
| Ratio of solvent having boiling point of lower than 200° C. (% by mass, with respect to total amount of organic solvents) |  |  | 0.0 | 47.0 | 68.0 | 53.0 |
| Total amount of surfactants |  |  | 0.5 | 0.5 | 0.5 | 0.5 |

In Tables 1 to 3, "b.p." denotes the normal boiling point. Further, each substance described as other than the substance name is as follows.

<Coloring Material>
P.B. 15:3: Pigment Blue 15:3
Fixing resin: styrene acrylic resin (JONCRYL 537J)
Wax: polyethylene wax (AQUACER 539)
Surfactant A: silicone-based surfactant A
BYK333: (maximum peak: 6760) manufactured by BYK-Chemie GmbH
Preparation Example 1 (maximum peak: 6500)
BYK 3480 (maximum peak: 4330) manufactured by BYK-Chemie GmbH
Surfactant B: silicone-based surfactant B
KF-6204 (maximum peak: less than 3000, HLB: 10) manufactured by Shin-Etsu Chemical Co., Ltd.
Tegowet 280 (maximum peak: less than 3000, HLB: 3.5) manufactured by Evonik Industries AG <Other Surfactants>
SAG503A (HLB: 11, maximum peak: less than 3000, manufactured by Shin-Etsu Chemical Co., Ltd., silicone-based surfactant, SILFACE SAG503A)
PD002W (manufactured by Nissin Chemical Co., Ltd., acetylene glycol-based surfactant, OLFINE PD002W)
Preparation Example 1 (silicone-based surfactant A): The surfactant was synthesized in the following manner.

A predetermined organohydrogenpolysiloxane and a polyether having a corresponding carbon-carbon double bond at a molecular terminal were allowed to react by platinum catalysis. In this manner, structure analysis was performed using a liquid chromatography mass spectrometer (LC-MS), thereby obtaining a silicone-based surfactant A of Preparation Example 1 in which d represents an integer of 4 to 6, e represents an integer of 13 to 15, f represents an integer of 4 to 12, g represents 0, $R^3$ represents $CH_3$, $R^4$ represents $-CH_2-$, and $R^5$ represents H in General Formula (3)

2.2. Measurement of Molecular Weight Distribution

The molecular weight distributions of the silicone-based surfactants A and the silicone-based surfactants B in Tables 1 to 3 were measured by gel permeation chromatography, and maximum peaks in a molecular weight range of 300 or greater were obtained. The results are listed in the tables. The measurement conditions are as follows.

<Measurement Conditions>
Solvent: tetrahydrofuran
Column: TSKgel SuperHZM-N (two columns) +TSKgel guard column SuperHZ-L
Column temperature: 40° C.
Injection volume: 25 μL
Detector: differential refractometer (RI)
Flow rate: 0.35 mL/min
Calibration curve: standard polystyrene TSK standard polystyrene (manufactured by Tosoh Corporation), using a calibration curve with thirteen samples having a Mw of 500 to 1000000

2.3. Evaluation Method

A printer (SC-S80650, manufactured by Seiko Epson Corporation, modified machine) was prepared, and one nozzle array of the ink jet head was filled with each ink composition. An ink jet head in which the nozzle density of the nozzle array was 360 dpi and 360 nozzles were provided was used as the ink jet head of the printer. Further, the printer had a platen heater performing primary drying at a position facing the ink jet head as shown in FIG. 1, and the surface temperature of the recording medium was controlled to be the value listed in Tables 4 to 7. Further, a secondary heater was provided at downstream of the printer, and the surface temperature of the recording medium was adjusted to 70° C. during the secondary drying. Here, a platen heater and a blast fan were provided as primary drying mechanisms in the examples, and the air speed of the fan was set to the value in the tables. The air speed in the vicinity of the surface of the recording medium directly below the ink jet head was defined as the air speed. The air temperature was measured in advance so as not to be affected by the platen heater, and was measured in the vicinity of the surface of the recording medium.

With the printer configured as described above, a solid pattern was recorded on PET50A (manufactured by Lintec Corporation, transparent PET film: type of recording medium M1 or plain paper: type of recording medium: M2) at a recording resolution of 720×720 dpi under the conditions listed in Tables 4 to 7. Further, the adhesion amount of the ink was set to 7 mg/inch$^2$ by adjusting the number of ink droplets or the amount of ink droplets per one-time pass according to the number of passes.

TABLE 4

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Ink | C01 | C02 | C03 | C04 | C05 | C06 | C07 | C08 | C09 | C10 | C11 |
| Adhesion amount mg/inch$^2$ | 7 | 7 | 7 | 7 | 7 | 7 | 7 | 7 | 7 | 7 | 7 |
| Type of recording medium | M1 | M1 | M1 | M1 | M1 | M1 | M1 | M1 | M1 | M1 | M1 |
| Surface temperature (° C.) | 45 | 45 | 45 | 45 | 45 | 45 | 45 | 45 | 45 | 45 | 45 |
| Air blast (air speed m/s) | 2 | 2 | 2 | 2 | 2 | 2 | 2 | 2 | 2 | 2 | 2 |
| Air temperature (° C.) | 25 | 25 | 25 | 25 | 25 | 25 | 25 | 25 | 25 | 25 | 25 |
| Number of passes in recording | 6 | 6 | 6 | 6 | 6 | 6 | 6 | 6 | 6 | 6 | 6 |
| Image quality (unevenness) | B | C | C | A | A | C | C | B | B | B | A |
| Image quality (OD value) | C | C | B | C | C | B | A | A | C | C | B |

TABLE 4-continued

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Rub resistance | A | A | A | C | D | B | C | B | B | B | A |
| Jetting stability | B | B | B | B | B | B | B | B | B | B | B |
| Productivity | B | B | B | B | B | B | B | B | B | B | B |

TABLE 5

|  | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|
| Ink | C12 | C13 | C14 | C15 | C16 | C17 | C21 | C22 | C23 | C24 | C25 |
| Adhesion amount mg/inch$^2$ | 7 | 7 | 7 | 7 | 7 | 7 | 7 | 7 | 7 | 7 | 7 |
| Type of recording medium | M1 | M1 | M1 | M1 | M1 | M1 | M1 | M1 | M1 | M1 | M1 |
| Surface temperature (° C.) | 45 | 45 | 45 | 45 | 45 | 45 | 45 | 45 | 45 | 45 | 45 |
| Air blast (air speed m/s) | 2 | 2 | 2 | 2 | 2 | 2 | 2 | 2 | 2 | 2 | 2 |
| Air temperature (° C.) | 25 | 25 | 25 | 25 | 25 | 25 | 25 | 25 | 25 | 25 | 25 |
| Number of passes in recording | 6 | 6 | 6 | 6 | 6 | 6 | 6 | 6 | 6 | 6 | 6 |
| Image quality (unevenness) | B | B | B | B | B | B | C | B | B | B | B |
| Image quality (OD value) | A | A | A | A | A | B | C | B | B | B | C |
| Rub resistance | B | B | B | B | B | B | A | A | C | C | A |
| Jetting stability | B | B | B | C | C | B | B | B | B | A | B |
| Productivity | B | B | B | B | B | B | B | B | B | B | B |

TABLE 6

|  | Example 23 | Example 24 | Example 25 | Example 26 | Example 27 | Example 28 | Example 29 | Example 30 | Example 31 | Example 32 | Example 33 |
|---|---|---|---|---|---|---|---|---|---|---|---|
| Ink | C26 | C27 | C28 | C29 | C30 | C01 | C04 | C01 | C01 | C01 | C01 |
| Adhesion amount mg/inch$^2$ | 7 | 7 | 7 | 7 | 7 | 7 | 7 | 7 | 7 | 7 | 7 |
| Type of recording medium | M1 | M1 | M1 | M1 | M1 | M1 | M1 | M1 | M1 | M1 | M1 |
| Surface temperature (° C.) | 45 | 45 | 45 | 45 | 45 | 45 | 45 | 40 | 50 | 45 | 45 |
| Air blast (air speed m/s) | 2 | 2 | 2 | 2 | 2 | 2 | 2 | 2 | 2 | 0.5 | 5 |
| Air temperature (° C.) | 25 | 25 | 25 | 25 | 25 | 25 | 25 | 25 | 25 | 25 | 25 |
| Number of passes in recording | 6 | 6 | 6 | 6 | 6 | 4 | 2 | 6 | 6 | 6 | 6 |
| Image quality (unevenness) | C | C | B | C | B | C | B | C | A | C | A |
| Image quality (OD value) | C | C | C | C | C | C | D | B | C | B | C |
| Rub resistance | B | C | B | D | B | B | C | A | A | A | A |

TABLE 6-continued

|  | Example 23 | Example 24 | Example 25 | Example 26 | Example 27 | Example 28 | Example 29 | Example 30 | Example 31 | Example 32 | Example 33 |
|---|---|---|---|---|---|---|---|---|---|---|---|
| Jetting stability | B | B | B | B | B | B | B | A | C | A | C |
| Productivity | B | B | B | B | B | A | A | B | B | B | B |

TABLE 7

|  | Example 34 | Example 35 | Comparative Example 1 | Comparative Example 2 | Comparative Example 3 | Comparative Example 4 | Comparative Example 5 | Comparative Example 6 | Comparative Example 7 | Reference Example 1 | Reference Example 2 |
|---|---|---|---|---|---|---|---|---|---|---|---|
| Ink | C01 | C01 | C18 | C19 | C20 | C01 | C01 | C18 | C18 | C01 | C18 |
| Adhesion amount mg/inch$^2$ | 7 | 7 | 7 | 7 | 7 | 7 | 7 | 7 | 7 | 7 | 7 |
| Type of recording medium | M1 | M1 | M1 | M1 | M1 | M1 | M1 | M1 | M1 | M2 | M2 |
| Surface temperature (° C.) | 45 | 25 | 45 | 45 | 45 | 45 | 45 | 45 | 45 | 45 | 45 |
| Air blast (air speed m/s) | 2 | 8 | 2 | 2 | 2 | 2 | 2 | 2 | 2 | 2 | 2 |
| Air temperature (° C.) | 40 | 25 | 25 | 25 | 25 | 25 | 25 | 25 | 25 | 25 | 25 |
| Number of passes in recording | 6 | 6 | 6 | 6 | 6 | 8 | 12 | 8 | 12 | 6 | 6 |
| Image quality (unevenness) | A | C | D | D | D | A | A | C | B | A | A |
| Image quality (OD value) | C | B | A | C | C | C | B | A | A | B | B |
| Rub resistance | A | A | A | A | A | A | A | A | A | D | D |
| Jetting stability | D | A | A | A | A | B | B | A | A | B | B |
| Productivity | B | B | B | B | B | C | C | C | C | B | B |

2.3.1. Image Quality (Unevenness)

The Solid Image of the Recorded Material in Each example was visually observed, and the visibility was evaluated according to the following evaluation criteria. The visibility was evaluated as poor when the pinning effect of the ink composition was small.

A: Shade unevenness was not found in the color of the pattern.
    B: Shade unevenness was slightly found.
    C: Shade unevenness was significantly found.
    D: Shade unevenness was largely found.

2.3.2. Image Quality (OD Value)

The OD values of the solid images of the recorded materials obtained as described above were measured under the following measurement conditions using a colorimeter (i1Pro2, manufactured by X-rite Inc.), and the color developability was evaluated according to the following evaluation criteria.

(Measurement Conditions)
Measuring device: i1Pro2 (manufactured by X-rite Inc.)
Measurement conditions: D50 light source, status T, standard observer 2°
Background: white paper
(Evaluation criteria)
    A: The OD value was 1.2 or greater.
    B: The OD value was 1 or greater and less than 1.2.
    C: The OD value was 0.8 or greater and less than 1.
    D: The OD value was less than 0.8.

2.3.3. Rub Resistance

A test (JIS P 8136) of reciprocating printed cotton fabric #3 50 times with a load of 500 g was performed on the recorded materials obtained as described above using a Gakushin type Color Fastness Rubbing Tester AB-301 (manufactured by TESTER SANGYO CO., LTD.). The rub resistance was evaluated according to the following evaluation criteria.

(Evaluation criteria)
    A: The image was not peeled off.
    B: Greater than 0% and less than 10% of the image was peeled off.
    C: 10% or greater and less than 40% of the image was peeled off.
    D: 40% or greater of the image was peeled off or the recording medium was broken.

2.3.4. Jetting Stability

Recording was performed for 2 hours under conditions for a recording test. Here, simulated recording in which the ink composition was not jetted from the head during the recording was performed. Suction cleaning was performed after the recording to recover non-jetted nozzles, and nozzle inspection was performed. 1 cc of ink was discharged from the nozzle array for one time cleaning.

A: All nozzles recovered after cleaning once.
    B: All nozzles recovered after cleaning three times.
    C: All nozzles recovered after cleaning six times.
    D: Some nozzles did not recover after cleaning six times.

2.3.5. Productivity

The number of recorded passes was used as an index of the productivity. The productivity was evaluated according to the following evaluation criteria.

(Evaluation Criteria)
    A: 4 passes or less
    B: greater than 4 passes and 7 passes or less
    C: greater than 7 passes 2.4. Evaluation Results In each example in which the number of times of scanning was 7 times or less and the ink composition was an aqueous ink containing a coloring material and a silicone-based surfactant A, the image quality (unevenness) of the obtained image was excellent and the productivity was also excellent. In the comparative examples with different results, at least one of the image quality (unevenness) or the productivity was poor.

The embodiments and the modified examples described above are merely examples, and the present disclosure is not limited thereto. For example, each embodiment and each modified example can be used in a combination as appropriate.

The present disclosure has configurations that are substantially the same as the configurations described in the embodiments, for example, configurations with the same functions, the same methods, and the same results as described above or configurations with the same purposes and the same effects as described above. Further, the present disclosure has configurations in which parts that are not essential in the configurations described in the embodiments have been substituted. Further, the present disclosure has configurations exhibiting the same effects as the effects of the configurations described in the embodiments or configurations capable of achieving the same purposes as the purposes of the configurations described in the embodiments. Further, the present disclosure has configurations in which known techniques have been added to the configurations described in the embodiments.

The following content is derived from the embodiments and the modified examples described above.

The recording method is a recording method including an adhesion step of adhering an ink composition to a recording medium, in which the recording medium is a low-absorbing recording medium or a non-absorbing recording medium, the adhesion step is performed by scanning that is carried out by jetting the ink composition from an ink jet head to make the ink composition adhere to the recording medium while moving relative positions of the ink jet head and the recording medium, the scanning is performed seven times or less on an identical region of the recording medium, the ink composition is an aqueous ink containing a coloring material and a silicone-based surfactant A, and a maximum peak of the silicone-based surfactant A in a molecular weight range of 300 or greater is present in a range of 3000 to 20000 in a molecular weight distribution obtained by gel permeation chromatography.

According to this recording method, since the ink composition containing a silicone-based surfactant A having a specific molecular weight distribution is used, aggregation unevenness of dots of the ink composition can be reduced, and an image with an excellent image quality can be obtained while the recording speed is increased even when the number of passes during the recording on a low-absorbing recording medium or a non-absorbing recording medium is set to 7 times or less, which is small.

In the recording method, the content of the silicone-based surfactant A may be set to 0.05% by mass or greater and 1.5% by mass or less with respect to the total amount of the ink composition.

According to this recording method, an image with a more excellent image quality can be obtained.

In the recording method, the ink composition may further contain one or more kinds of glycol monoether serving as an organic solvent and a silicone-based surfactant B in which the maximum peak in a molecular weight range of 300 or greater is not present in a molecular weight range of 3000 or greater in the molecular weight distribution obtained by the gel permeation chromatography and the HLB value obtained by the Griffin method is 10.5 or less.

According to this recording method, since the ink composition further containing the silicone-based surfactant B having a molecular weight relatively less than the molecular weight of the silicone-based surfactant A is used, an image in which the wet spreadability of the ink composition on the recording medium is more excellent and filling (color development) of dots is more excellent can be formed. Further, an image in which both the wet spreadability and the filling are more satisfactory can be formed when the ink composition contains glycol monoether.

In the recording method, the ink composition contains glycol monoether serving as an organic solvent, and the normal boiling point of the glycol monoether may be 100° C. or higher and 200° C. or lower.

According to this recording method, the silicone-based surfactant A is likely to suppress the web spreadability of the ink composition, and thus the filling (color development) of the image is likely to be degraded, but an image in which both the wet spreadability and the filling are more satisfactory can be formed when the ink composition contains a glycol monoether solvent having a normal boiling point of 100° C. or higher and 200° C. or lower.

In the recording method, the number of carbon atoms in the ether moiety of the glycol monoether may be two or less.

According to the recording method, an image in which both the wet spreadability and the filling are more satisfactory can be formed.

In the recording method, the silicone-based surfactant A may be a compound represented by General Formula (1) or General Formula (3).

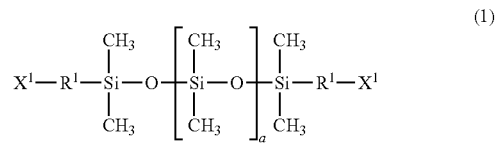

(In General Formula (1), $R^1$'s each independently represent an alkylene group having 1 or more and 6 or less carbon atoms or a single bond, $X^1$'s each independently represent a polyether group represented by General Formula (2), and a represents an integer of 10 or greater and 80 or less.)

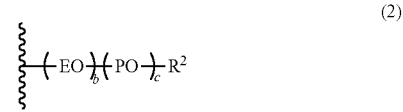

(In General Formula (2), R2 represents a hydrogen atom, an alkyl group having 1 or more and 6 or less carbon atoms, or a (meth)acrylic group, EO represents an ethylene oxide group, PO represents a propylene oxide group, EO and PO are in a random order, b represents an integer of 0 or greater, c represents an integer of 0 or greater, and b+c is 1 or greater.)

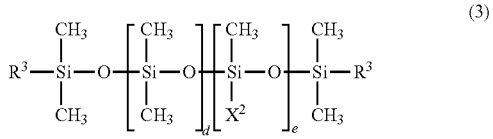

(3)

(In General Formula (3), $R^3$'s each independently represent an alkyl group having 1 or more and 6 or less carbon atoms, $x^2$'s each independently represent a polyether group represented by General Formula (4), d and e represent an integer of 1 or greater, and d+e is 2 or greater and 50 or less.)

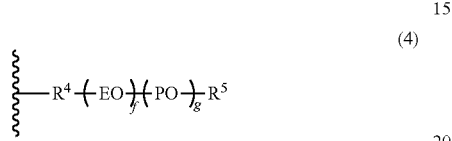

(4)

(In General Formula (4), $R^4$ represents an alkylene group having 1 or more and 6 or less carbon atoms or a single bond, $R^5$ represents a hydrogen atom or an alkyl group having 1 or more and 6 or less carbon atoms, EO represents an ethylene oxide group, PO represents a propylene oxide group, EO and PO are in a random order, f represents an integer of 0 or greater, g represents an integer of 0 or greater, and f+g is 1 or greater.)

According to this recording method, an image with a more excellent image quality can be obtained.

In the recording method, the total content of surfactants in the ink composition may be 2.0% by mass or less with respect to the total amount of the ink composition.

According to this recording method, an image with a more excellent image quality can be obtained.

In the recording method, the ink composition may contain organic solvents, and the normal boiling point of an organic solvent having a highest boiling point among the organic solvents contained in the ink composition may be 250° C. or lower.

According to this recording method, an image with a more excellent image quality can be obtained.

In the recording method, in the adhesion step, the scanning and sub-scanning carried out by moving the relative positions of the ink jet head and the recording medium in a direction intersecting a direction of the scanning may be respectively performed a plurality of times, and the scanning carried out on an identical region of the recording medium may be performed 2 times or more and 5 times or less.

According to this recording method, an image with a more excellent image quality can be obtained.

In the recording method, the ink composition may contain a both-terminal diol having 5 or less carbon atoms, as an organic solvent.

According to this recording method, an image with a more excellent image quality can be obtained.

In the recording method, the recording method may further include a primary drying step.

According to this recording method, an image with a more excellent image quality can be obtained.

In the recording method, the primary drying step may include drying the ink composition with an air blast, and the air blast may be carried out at a speed of 0.5 m/s or greater and 15 m/s or less.

According to this recording method, an image with a more excellent image quality can be obtained.

In the recording method, the recording medium in the primary drying step may have a surface temperature of 45° C. or lower.

According to this recording method, an image with a more excellent image quality can be obtained.

What is claimed is:

1. A recording method comprising:
an adhesion step of adhering an ink composition to a recording medium,
wherein the recording medium is a low-absorbing recording medium or a non-absorbing recording medium,
the adhesion step is performed by scanning that is carried out by jetting the ink composition from an ink jet head to make the ink composition adhere to the recording medium while moving relative positions of the ink jet head and the recording medium,
the scanning is performed seven times or less on an identical region of the recording medium,
the ink composition is an aqueous ink containing a coloring material and a silicone-based surfactant A, and
a maximum peak of the silicone-based surfactant A in a molecular weight range of 300 or greater is present in a range of 3000 to 20000 in a molecular weight distribution obtained by gel permeation chromatography.

2. The recording method according to claim 1,
wherein a content of the silicone-based surfactant A is 0.05% by mass or greater and 1.5% by mass or less with respect to a total amount of the ink composition.

3. The recording method according to claim 1,
wherein the ink composition further contains one or more of glycol monoether as an organic solvent and a silicone-based surfactant B in which the maximum peak in a molecular weight range of 300 or greater is not present in a range of 3000 or greater in the molecular weight distribution obtained by the gel permeation chromatography and an HLB value obtained by a Griffin method is 10.5 or less.

4. The recording method according to claim 1,
wherein the ink composition contains glycol monoether as an organic solvent, and
the glycol monoether has a normal boiling point of 100° C. or higher and 200° C. or lower.

5. The recording method according to claim 4,
wherein an ether moiety of the glycol monoether has 2 or less carbon atoms.

6. The recording method according to claim 1,
wherein the silicone-based surfactant A is a compound represented by General Formula (1) or General Formula (3),

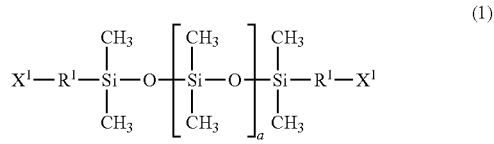

(1)

in General Formula (1), $R^1$'s each independently represent an alkylene group having 1 or more and 6 or less carbon atoms or a single bond, $X^1$'s each independently represent a polyether group represented by General Formula: (2), and a represents an integer of 10 or greater and 80 or less,

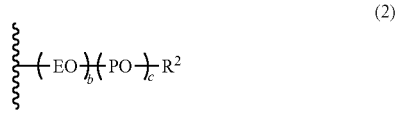

(2)

in General Formula (2), $R^2$ represents a hydrogen atom, an alkyl group having 1 or more and 6 or less carbon atoms, or a (meth)acrylic group, EO represents an ethylene oxide group, PO represents a propylene oxide group, EO and PO are in a random order, b represents an integer of 0 or greater, c represents an integer of 0 or greater, and b+c is 1 or greater,

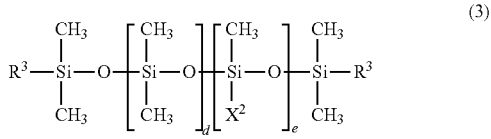

(3)

in General Formula (3), $R^3$'s each independently represent an alkyl group having 1 or more and 6 or less carbon atoms, $X^2$'s each independently represent a polyether group represented by General Formula (4), d and e represent an integer of 1 or greater, and d+e is 2 or greater and 50 or less, and

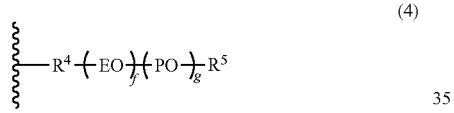

(4)

in General Formula (4), $R^4$ represents an alkylene group having 1 or more and 6 or less carbon atoms or a single bond, $R^5$ represents a hydrogen atom or an alkyl group having 1 or more and 6 or less carbon atoms, EO represents an ethylene oxide group, PO represents a propylene oxide group, EO and PO are in a random order, f represents an integer of 0 or greater, g represents an integer of 0 or greater, and f+g is 1 or greater.

7. The recording method according to claim 1, wherein a total content of surfactants in the ink composition is 2.0% by mass or less with respect to a total amount of the ink composition.

8. The recording method according to claim 1, wherein the ink composition contains organic solvents, and
a normal boiling point of an organic solvent having a highest normal boiling point among the organic solvents contained in the ink composition is 250° C. or lower.

9. The recording method according to claim 1, wherein in the adhesion step, the scanning and sub-scanning carried out by moving the relative positions of the ink jet head and the recording medium in a direction intersecting a direction of the scanning are respectively performed a plurality of times, and the scanning carried out on an identical region of the recording medium is performed 2 times or more and 5 times or less.

10. The recording method according to claim 1, wherein the ink composition contains a both-terminal diol having 5 or less carbon atoms, as an organic solvent.

11. The recording method according to claim 1, further comprising:
a primary drying step.

12. The recording method according to claim 11, wherein the primary drying step includes drying the ink composition with an air blast, and
the air blast is carried out at an air speed of 0.5 m/s or greater and 15 m/s or less.

13. The recording method according to claim 11, wherein the recording medium in the primary drying step has a surface temperature of 45° C. or lower.

* * * * *